United States Patent [19]
Agrawal

[11] Patent Number: 5,822,932
[45] Date of Patent: Oct. 20, 1998

[54] METHOD FOR MAKING A VEHICLE WINDOW PANEL USING A MELT-PROCESSIBLE GASKET MATERIAL

[75] Inventor: Raj K. Agrawal, Holland, Mich.

[73] Assignee: Donnelly Corporation, Holland, Mich.

[21] Appl. No.: 801,700

[22] Filed: Feb. 14, 1997

Related U.S. Application Data

[62] Division of Ser. No. 289,378, Aug. 12, 1994, Pat. No. 5,635,281.

[51] Int. Cl.⁶ .............................. E04C 1/42; E06B 1/26; E06B 3/56
[52] U.S. Cl. ..................... 52/597; 52/204.62; 52/208; 52/800.14; 156/71; 156/108; 156/303.1; 156/307.7; 156/330.9
[58] Field of Search .............................. 156/108, 303.1, 156/307.7, 330.9, 71; 52/204.62, 204.597, 204.591, 208, 800.14

[56] References Cited

U.S. PATENT DOCUMENTS

| | | | |
|---|---|---|---|
| 226,770 | 4/1880 | Morse | 228/120 |
| 1,963,941 | 6/1934 | Duffy | 49/147 |
| 2,502,970 | 4/1950 | Manning | 310/365 |
| 2,507,965 | 5/1950 | Eichner | 16/225 |
| 2,555,204 | 5/1951 | Sorrell | 49/147 |
| 2,592,411 | 4/1952 | Frohnapel | 16/225 |
| 2,608,926 | 9/1952 | Helsley | 454/128 |
| 2,617,481 | 11/1952 | Frohnapel | 160/231.2 |
| 2,679,201 | 5/1954 | Scharmen | 454/135 |
| 2,738,838 | 3/1956 | Sutter | 160/95 |
| 2,829,081 | 4/1958 | Sweem | 156/300 |
| 2,948,015 | 8/1960 | Hansen | 16/297 |
| 3,032,808 | 5/1962 | Fleming | 16/225 |
| 3,052,496 | 9/1962 | Frey | 49/36 |
| 3,343,867 | 9/1967 | Couch et al. | 296/97.9 |
| 3,713,578 | 1/1973 | Johnson | 229/125 |
| 3,806,188 | 4/1974 | Tantlinger | 296/146.16 |

(List continued on next page.)

FOREIGN PATENT DOCUMENTS

| | | |
|---|---|---|
| 47446/85 | 3/1986 | Australia . |
| 0081426 | 6/1983 | European Pat. Off. . |
| 0402254 | 12/1990 | European Pat. Off. . |
| 3140366 | 2/1985 | Germany . |
| 1122722 | 5/1989 | Japan . |
| 2258844 | 10/1990 | Japan . |
| 370626 | 3/1991 | Japan . |
| 3236922 | 10/1991 | Japan . |
| 167457 | 8/1922 | United Kingdom . |

OTHER PUBLICATIONS

Essex Specialty Products Betaseal® 43555 PVC Primer Process Standard and Description (Apr. 1991).

Material Safety Data Sheet (MSDS) for Betaseal® 43555 Primer from Essex Specialty Products (Sep. 27, 1991).

MSDS for Betaseal® 57302 Urethane Adhesive for Essex Specialty Products (Dec. 9, 1992).

MSDS for A–1167–B manufactured by BF Goodrich Adhesive Systems (Apr. 17, 1990).

(List continued on next page.)

*Primary Examiner*—Francis J. Lorin
*Attorney, Agent, or Firm*—Van Dyke, Gardner, Linn & Burkhart, LLP

[57] ABSTRACT

A vehicle window panel assembly and a manufacturing method for such assemblies having a gasket made from a melt-processible material and providing a long-term, failure-resistant bond between the gasket and window panel for retaining the window panel assembly in the vehicle. The gasket material provides a bond which resists both short- and long-term dynamic and static loads exerted on attachment members embedded in the gasket to prevent failure or separation between the gasket member and the window panel assembly for prolonged assembly life and substantial saving to vehicle manufacturers and owners. A method for identifying and selecting the melt-processible material for forming the gasket member is also disclosed.

28 Claims, 11 Drawing Sheets

U.S. PATENT DOCUMENTS

| | | |
|---|---|---|
| 3,827,184 | 8/1974 | Pennec et al. .............................. 49/449 |
| 3,837,984 | 9/1974 | Wagner et al. .......................... 428/349 |
| 3,881,303 | 5/1975 | Krafka et al. ........................... 56/192 |
| 3,885,072 | 5/1975 | Zibritosky ................................ 428/38 |
| 3,916,055 | 10/1975 | Wagner .................................. 428/161 |
| 3,945,975 | 3/1976 | Strack .................................... 260/33.6 |
| 4,093,304 | 6/1978 | Ziegler .................................. 296/84 D |
| 4,139,234 | 2/1979 | Morgan ................................ 296/84 R |
| 4,167,259 | 9/1979 | Bury ...................................... 248/205 |
| 4,184,000 | 1/1980 | Denman ................................ 428/347 |
| 4,363,191 | 12/1982 | Morgan .................................... 49/381 |
| 4,364,214 | 12/1982 | Morgan et al. .......................... 52/311 |
| 4,364,595 | 12/1982 | Morgan et al. ...................... 296/84 R |
| 4,396,221 | 8/1983 | Morgan et al. ....................... 296/84 C |
| 4,579,930 | 4/1986 | Kramer et al. ........................... 528/71 |
| 4,606,159 | 8/1986 | Kunert .................................... 52/208 |
| 4,625,459 | 12/1986 | Warner .................................... 49/488 |
| 4,650,830 | 3/1987 | Yonekura et al. .................... 525/193 |
| 4,700,525 | 10/1987 | Nieboer et al. .......................... 52/698 |
| 4,712,341 | 12/1987 | Harris, Jr. et al. ...................... 52/208 |
| 4,723,809 | 2/1988 | Kida et al. ........................... 296/84 R |
| 4,758,629 | 7/1988 | Deyrup et al. ......................... 525/194 |
| 4,761,916 | 8/1988 | Sanok et al. ............................. 49/381 |
| 4,777,699 | 10/1988 | Hill et al. ................................ 16/225 |
| 4,799,344 | 1/1989 | Francis .................................... 52/235 |
| 4,822,656 | 4/1989 | Hutter, III .............................. 428/40 |
| 4,841,698 | 6/1989 | Gold ........................................ 52/208 |
| 4,861,540 | 8/1989 | Nieboer et al. ....................... 264/263 |
| 4,925,237 | 5/1990 | Böhm et al. .......................... 296/216 |
| 4,929,647 | 5/1990 | Burger et al. ........................... 522/99 |
| 4,951,907 | 8/1990 | Gold .................................... 248/205.5 |
| 4,986,595 | 1/1991 | Gold ...................................... 296/201 |
| 5,050,928 | 9/1991 | Böhm et al. .......................... 296/216 |
| 5,057,354 | 10/1991 | Kunert et al. ......................... 428/192 |
| 5,062,248 | 11/1991 | Kunert .................................... 152/208 |
| 5,064,494 | 11/1991 | Duck et al. ......................... 156/273.5 |
| 5,082,736 | 1/1992 | Bravet et al. ........................ 428/425.6 |
| 5,158,638 | 10/1992 | Osanami et al. ....................... 156/245 |
| 5,171,508 | 12/1992 | Ishizu et al. ............................ 264/236 |
| 5,212,238 | 5/1993 | Scheibelhoffer et al. ................ 525/66 |
| 5,236,650 | 8/1993 | Choby et al. ......................... 264/135 |
| 5,264,270 | 11/1993 | Agrawal ................................ 428/192 |
| 5,331,784 | 7/1994 | Agrawal et al. ......................... 52/393 |
| 5,362,787 | 11/1994 | Ngoc et al. ............................ 524/297 |
| 5,443,673 | 8/1995 | Fisher et al. ........................... 156/245 |

OTHER PUBLICATIONS

Ford Motor Company Engineering Material Specification for VESB–M2G246–A/ESB–M2G246–B (1981) (month of publication not known).

Bayflex Polyurethane Elastomer Mold Design Manual—Mobay Chemical Corporation (1982) (month of publication not known).

Textbook of Polymer Science, 3rd Edition, pp. 320–323 "The Glassy State and the Glass Transition."

SAE Technical Paper—910758—Application of RIM Urethane to One Side of Glass for Automotive Windows; SAE International (Feb. 1991).

SAE Technical Paper—900519—Case Study, An Encapsulated Window Program Between a U.S. Supplier and a Japanese Automobile Company (Feb. 1990).

European Search Report in EPO Application No. 95 30 52 52, which corresponds to the parent of the present application, namely, Ser. No. 08/289,378, filed Aug. 12, 1994.

"Standard Test Methods for Tensile, Compressive and Flexural Creep and Creep–Rupture of Plastics," *American Society for Testing and Materials*, ASTM Designation: D 2990–91 (Jan. 1992), pp. 483–490.

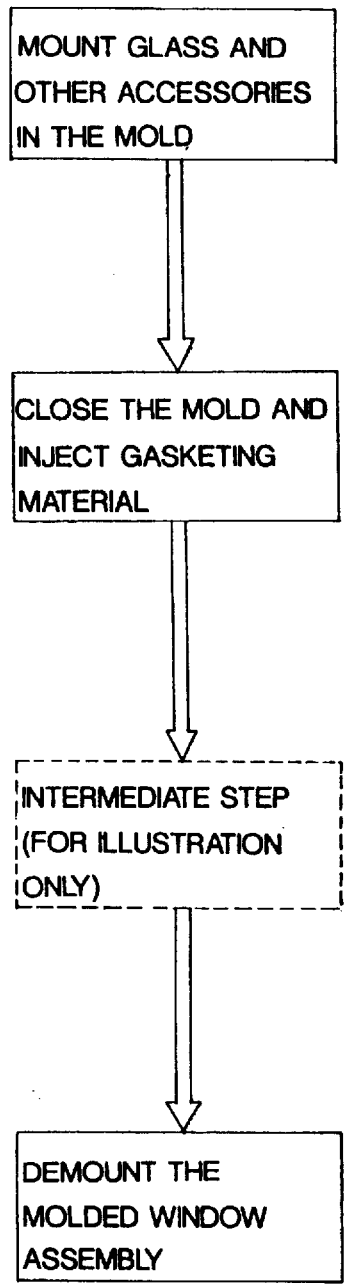
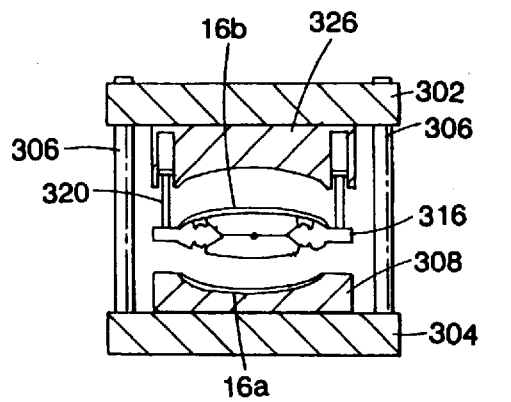
FIG. 22A
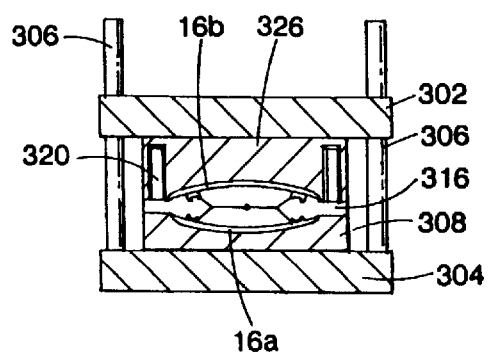
FIG. 22B
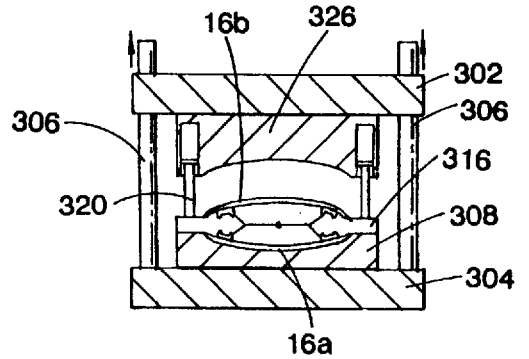
FIG. 22C
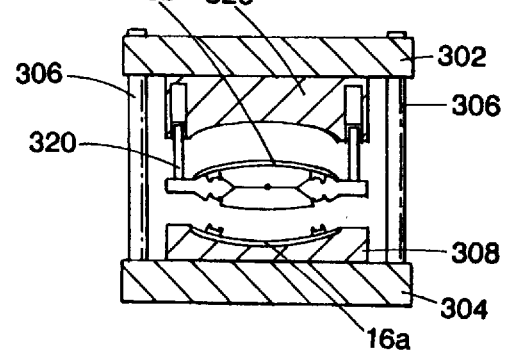
FIG. 22D
FIG. 22

METHOD FOR MAKING A VEHICLE WINDOW PANEL USING A MELT-PROCESSIBLE GASKET MATERIAL

CROSS REFERENCE TO RELATED APPLICATION

This is a division of U.S. patent application Ser. No. 08/289,378, filed Aug. 12, 1994, now U.S. Pat. No. 5,635,281.

FIELD OF THE INVENTION

The present invention relates to vehicular window panels, and particularly to a single- or two-sided gasketed window assembly and method of selecting melt-processible materials for such assemblies, as well as a method for selecting materials enabling secure, long-term attachment of the window panel to the vehicle under short- and long-term static and dynamic loads.

BACKGROUND OF THE INVENTION

Conventional modular vehicle window panels consist of at least one panel of glass shaped to generally fit in an opening defined by the sheet metal of the vehicle and sealed therein by a gasket attached to the peripheral edge of the glass panel. Traditionally, the gasket was formed such that the gasket completely enclosed the peripheral edge of the panel and included flanges which extended inwardly on opposing surfaces of the panel. This "three-sided encapsulation" provided mechanical anchoring of the gasket to the panel.

Contemporary modular vehicle window panels may have a gasket formed on at least one surface of the panel along the peripheral edge of the panel but do not have gasket material extending onto the exterior surface. Such gaskets are formed along the inner surface of the panel proximate the peripheral edge and are known in the art as single-sided encapsulation. Other shapes or forms of gaskets include a portion which wraps partially around and onto the peripheral edge but does not extend onto the exterior surface and are known in the art as two-sided encapsulation. The two-sided encapsulant gasket along the peripheral edge can be flush with the exterior surface of the panel. Single-sided or two-sided gasketed panels have been sometimes designated "flush glazings or panels" because of the absence of gasketing material extending onto the exterior surface of the panel and because of their ability to facilitate mounting of window glazings generally flush with the exterior of the sheet metal body of the vehicle.

A problem with single- or two-sided encapsulant glazings or panels is that they do not offer the mechanical retention of the window offered by "three-sided encapsulant" modular windows. In the case of single- or two-sided gasketed panels, the gasket may be bonded to the sheet metal or the glass panel may be bonded to the sheet metal to retain the glass in the window opening such as by use of an adhesive. Mechanical fasteners have also been used to retain the modular panel in the window opening. An example of one specific mechanical fastener includes a stud partially encapsulated by the gasket material located about or near the peripheral edge of the panel. The stud may have a head spaced from the panel and encapsulated in the gasket material such that the stud floats with respect to the panel. The stud also includes a shaft which extends through the sheet metal of the window opening and is secured such as by a nut to retain the panel in the vehicle. Although a stud is one type of fastener used, others may also be used including clips and ratcheted studs or trees.

In terms of selection of gasketing material, prior artisans have used a variety of melt-processible materials for window encapsulation, with injection molding of plasticized polyvinylchloride (PVC) resin enjoying commercial success, particularly for three-sided encapsulation, and have used materials, principally thermosetting urethanes, that are not melt processible, but are rather formed by liquid injection molding such as in reaction injection molding (RIM) of polyurethane. Melt processing is a desirable technique for fabrication of the gaskets of this invention for a variety of reasons. For example, melt processing involves processing at elevated temperature, such as in excess of 100° C., and is amenable to formation of gaskets onto substrates that are themselves heated. Such elevated temperature is useful for enhancing adhesion between the gasket and the window panel. Also, unlike RIM of thermosetting urethane, melt processing allows potential use of a wide variety of materials, both thermoplastic and thermosetting, with the added advantage of allowing formation using melt processing of recyclable gaskets that are desired to assist preservation of the environment.

However, although in the past a wide variety of melt-processible materials, such as PVC, have been suggested for forming gaskets such as single- or two-sided gaskets, particular attention has not been paid to the long-term bonding characteristic of the gasket to the glass when the assembly is attached to the vehicle by mechanical fasteners floating in the gasket material. Loads imposed on the fasteners embedded in the gasket are transferred to the bond line between the panel and the gasket. The types of loads include tensional-loads or off-form loads caused by differences or variations in the shape of the window panel and the sheet metal opening; static loads on the panel assembly itself caused by the weight of the glazing on the fasteners; and dynamic loads imposed on the studs through normal use, including vibration of the vehicle, acceleration/deceleration of the vehicle, wind and air pressure on the interior and exterior of the vehicle, and other activities such as the opening and closing of the vehicle doors.

In single- and two-sided encapsulations such as those described above, it has been found that over time, the bond between the panel and the gasket may fail in adhesion in an area localized about the fastener. Such failure can result in water leaks, wind noise, and rattling of the window panel in the vehicle opening. Previous solutions to these problems include directly attaching the fastener to the glass panel so that the loads are transferred directly to the window panel instead of to the gasket, or even dispensing with fasteners and utilizing direct gasket-to-vehicle adhesion using an adhesive applied substantially between the gasket and vehicle opening. Such attachment methods result in extra processing and may be time-consuming resulting in additional costs in the panel. Other solutions include closer stamping tolerances and fabrication of the welding of the window opening, which also may result in increased time and labor expenditures resulting in a more expensive product. Additional solutions include use of non-melt-processible gasketing material such as RIM or thermosetting urethane with the consequent loss of the benefit associated with melt processing described above.

SUMMARY OF THE INVENTION

The instant invention is directed to a vehicle window assembly and a method incorporating the selection of materials for single- or two-sided vehicle panel gaskets or grommets and which comprise at least one mechanical fastener partially encapsulated by the gasket material about or near the peripheral edge of the panel. The fastener often includes an anchor or head spaced from the panel and encapsulated in the gasket material such that the fastener floats with respect to the panel. The invention provides long-term bonding of the gasket with the glazing under dynamic and long-term static loads. Such long-term bonding is achieved using a method for selecting a melt-processible material for forming single- or two-sided encapsulations having a multi-phase morphology and which are resistant to tensile creep. The multi-phase morphology of the material is indicated by the variation of the elastic storage modulus as a function of temperature, wherein the material exhibits a rubbery plateau disposed between a lower transition point and a higher transition point and with the onset of the rubbery plateau commencing at a temperature below about 50° C. (preferably, below about 30° C.). The lower transition point marks the transition temperature where the character of the material changes from a state exhibiting significant rigidity to a state exhibiting significant flexibility, while the higher transition point marks the transition temperature where the character of the material changes from a state exhibiting significant flexibility to a state exhibiting significant viscous flow. It is preferred that the lower transition point be less than 24° C., preferably less than 0° C., and most preferably less than −20° C., while the higher transition point be greater than 60° C., preferably greater than 80° C., and most preferably greater than 100° C. The lower transition point and the higher transition point both occur at temperatures within the range of automotive interest, which is between about −50° C. to about +150° C.

Another form of the invention is directed to a method for manufacturing a vehicle window panel including providing a window panel having a peripheral edge and forming a gasket on the window panel from a melt-processible material having a multi-phase morphology. It is preferred that the multi-phase morphology exhibit a rubbery plateau disposed between a lower transition point having a temperature less than 24° C., preferably less than 0° C., and most preferably less than −20° C., and a higher transition point having a temperature greater than 60° C., preferably greater than 80° C., and most preferably greater than 100° C.

Another form of the invention includes a vehicle window panel including a gasket attached to at least one side of the panel where the gasket is made from a melt-processible material exhibiting a multi-phase morphology. The multi-phase morphology exhibits a rubbery plateau disposed between the transition points as defined above.

Yet another form of the invention relates to the economical use of melt-processible gasketing materials that are cross-linkable to provide long-term bonding of the gasket under dynamic and long-term static loads.

And, yet another form of the invention relates to novel mold designs particularly well adapted for economical molding of large area automotive modular windows such as the single- and two-sided encapsulated windows of this invention.

The advantages provided by this invention include providing a window panel gasketing material which can be formed by melt processing such as by injection molding, compression molding, extrusion, and their like, and attached to the vehicle window panel in a variety of forms. Moreover, studs or other attachment members can be partially encapsulated by the gasket material and used for attaching the window panel to the vehicle without localized failure in the gasket-to-window panel joint caused by short- or long-term static and dynamic loads. The integrity of the seal between the vehicle window panel and the vehicle itself is sustained without the additional costs resulting from a separate bonding of the stud directly to the window panel, or substantially reducing the tolerances between the shape of the vehicle panel opening and the window panel itself. A window panel of improved performance is produced at a lower cost.

BRIEF DESCRIPTION OF THE DRAWING FIGURES

A better understanding of the invention and the advantages provided thereby may be obtained by reference to the specification and the attached drawing figures, wherein.

Figure 24:
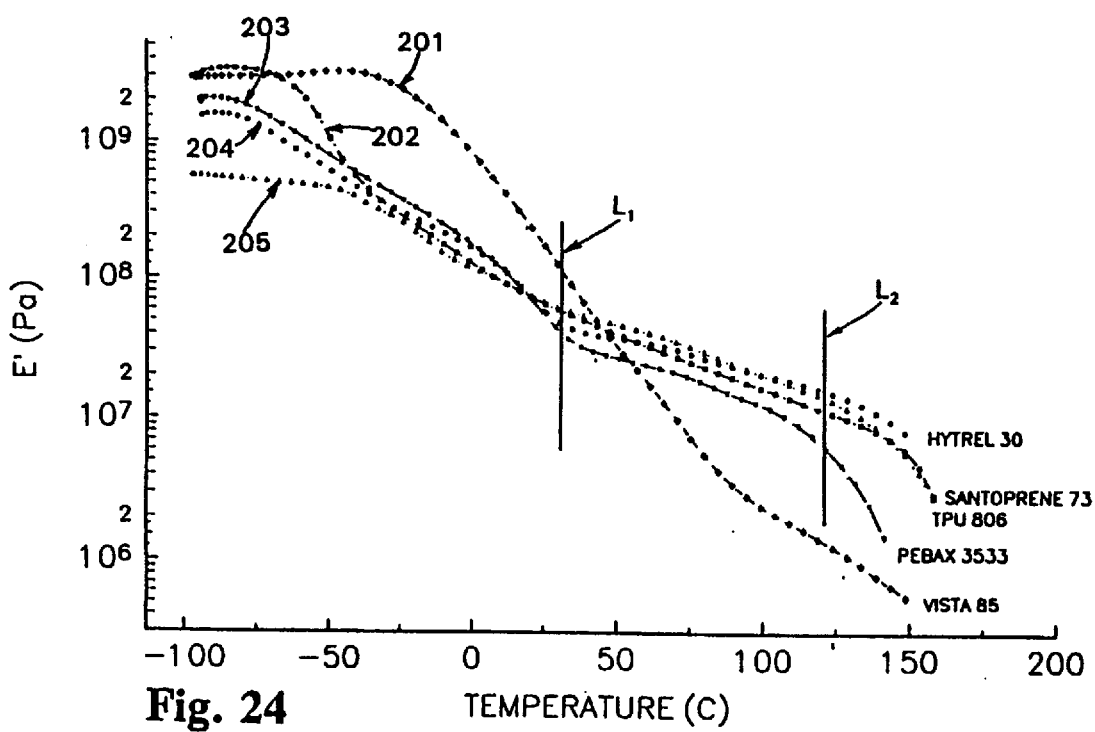
Figure 23:
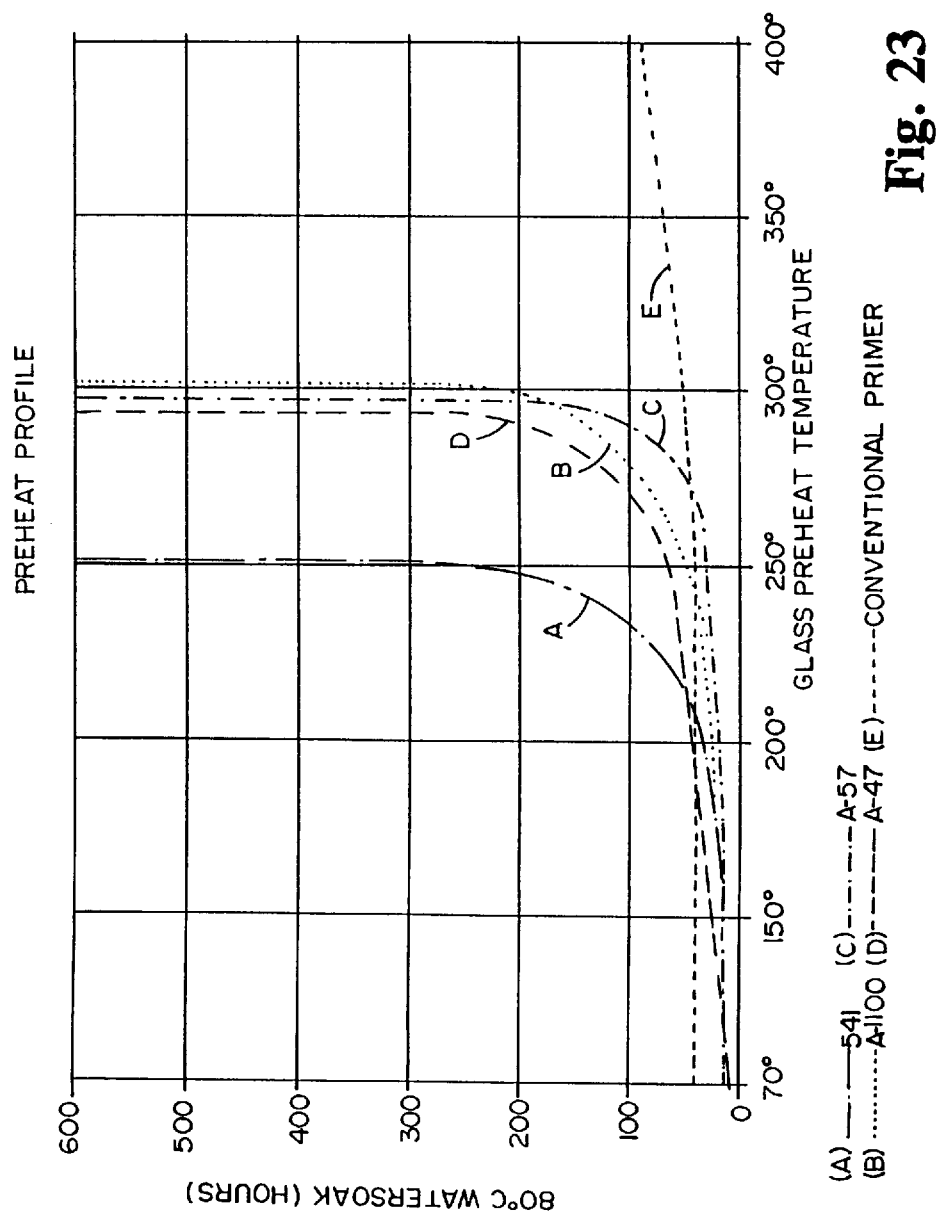

FIGS. 22A, 22B, 22C, and 22D illustrate operation of the stacked-cavity injection mold apparatus and the molding process for simultaneously forming the gaskets on the window panels;

FIG. 23 graphically illustrates the adhesion characteristics of several adhesive primers used in the invention; and FIG. 24 illustrates a plot of elastic storage modulus versus temperature for various materials.

DETAILED DESCRIPTION OF THE PREFERRED EMBODIMENTS

For the purposes of the following description, the terms "upper," "lower," "right," "left," "front," "rear," "vertical,"

"horizontal," and derivatives or equivalents thereof shall relate to the invention as oriented in FIGS. 2 to 24. It is understood that the invention may assume various alternative orientations, except where expressly specified to the contrary. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered limiting unless the claims expressly state otherwise.

Figure 1:
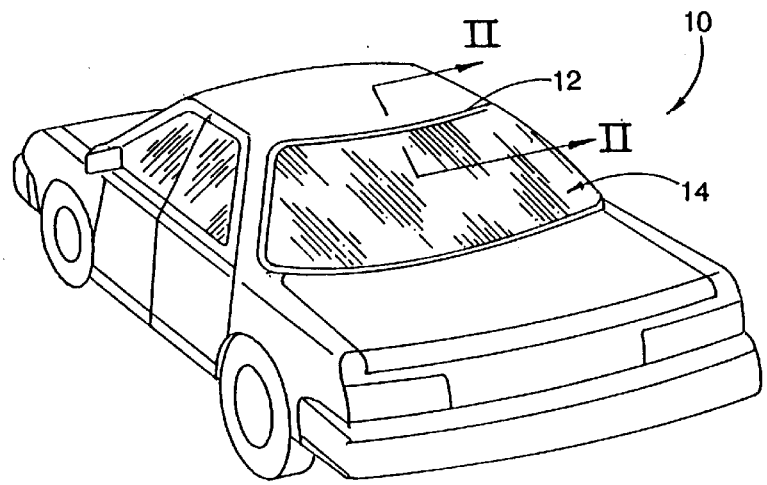
FIG. 1 is a perspective view of a window panel in a vehicle.

Referring to FIG. 1, a vehicle 10 contains at least one fixed window panel assembly 14 mounted in a window opening 12 formed by the sheet metal exterior of the vehicle body. Traditionally, the vehicle window assembly 14 includes one or more sheets of transparent glass generally shaped to fit in the window opening. Recently, the trend has been to produce vehicle window panels where the gasket is attached to at least the interior surface of the panel to produce a flush glazing, such that the exterior surface of the panel is generally flush with the exterior of the sheet metal body. Such flush glazings are retained in the window opening using various techniques including adhesives and/or mechanical attachments.

A preferred embodiment of the window panel assembly 14 (FIG. 2) includes a panel or sheet 16, preferably of transparent, tempered, laminated, or otherwise strengthened glass formed using conventional techniques and principles, with two substantially parallel sides, surfaces, or faces 18, 20, which terminate at a peripheral edge 22. Although transparent glass is preferred, other sheet-like panel materials may be used such as opaque or coated glass, transparent-coated or opaque plastic materials, or multi-composite laminates such as transparent glass and plastic. Optionally, and preferably, deposited and bonded to the surface 18 of panel 16 is an opaque blackout layer such as a black frit layer, and most preferably a ceramic frit layer or coating 24 covering and concealing a region from peripheral edge 22 inward. Alternately, frit layer 24 may cover all or substantially all of surface 18. Usually, however, frit layer 24 conceals a peripheral area of surface 18 near edge 22, such as two or so inches in from edge 22.

Fixed to ceramic frit layer 24, and extending along and around at least a portion of sheet 16 and spaced in from peripheral edge 22, is a polymeric form or bead, preferably flexible and resilient, which defines a static spacer, gasket, or grommet 26 (hereinafter referred to as "gasket") intended to engage pinch weld flange 12' of the window opening when installed. In the present invention, it is preferred that polymeric gasket 26 be formed from a melt-processable material described in greater detail below.

In one embodiment (FIG. 2), gasket 26 includes a body 28 of generally trapezoidal cross-section having a first surface 30 in intimate contact with, and bonded to, ceramic frit layer 24. An opposite surface 32 includes a generally rectangular channel 34 which may extend along the entire length of spacer or gasket 26. Gasket 26 forms a spacer seal to body 28. Channel 34, in turn, defines first and second flanges 36, 38, respectively, which run adjacent channel 34. Although it is preferred that spacer seal gasket 26 have a width less than or equal to about 1.00 inch (preferably less than about 0.75 inch, and more preferably, less than about 0.5 inch) and a thickness less than or equal to 1.0 inch, the thickness and width of gasket body 28 and flanges 36, 38 may vary depending upon the application of window panel assembly 14.

Disposed in gasket 26 is an attachment member 40 to position, guide, and fix panel assembly 14 within window opening 12. Attachment member 40 includes a locating and/or mounting stud having a shaft portion 42 terminating at one end in a circular or rectangular head portion 44. Head portion 44 and a portion of shaft 42 are encapsulated so as to float within gasket 26 such that the remaining portion of the shaft extends out from gasket 26 in a direction away from panel 16. It is preferred that shaft 42 extend from surface 32 in a direction substantially perpendicular to panel 16. Head portion 44 and/or shaft 42 may be fabricated of metal, plastic, composite, or their combination. If desired, a nut or similar securing member 45 may be attached to the shaft on the opposite side of pinch flange 12', to pull gasket 26 tightly against pinch flange 12' and retain panel assembly 14 in place. A bead of adhesive (not shown) may be located either on the panel 16 or on gasket 26 to further help retain and seal the panel assembly within window opening 12. Alternatively, a butyl tape may be deposited in channel 34 either adjacent or around stud shaft 42 to form a water-resistant seal with pinch flange 12'.

Alternate embodiments of the gasket which may be used in association with the window panel are endless and depend solely on the manufacturing technique. Such accepted melt-processing techniques in the industry include injection molding, compression molding, extrusion, blow molding, as well as others. Examples of different embodiments include a body 46 (FIG. 3) of generally trapezoidal cross-section having a surface 48 in contact with frit layer 24. An opposite surface 50 includes a channel 52 extending along the length of the gasket defined by flanges 54, 56. Extending from channel 52 is attachment member 40a, such as described earlier, with a head 44a and portion of the shaft 42a partially encapsulated by the gasket material and spaced from the inner surface 18a so as to float in the gasket body 46a. Extending from body 46a and outer flange 56, arcuately away from inner surface 18a around peripheral edge 22a, is a flange 58 intended to occupy and close the gap between the vehicle sheet metal and the window panel so as to form a lip seal. In this embodiment, peripheral edge 22a of glass panel 16a is exposed.

Another form of the gasket 60 (FIG. 4), in the form of a two-sided encapsulant, includes a body encapsulating an attachment member as described earlier, but varies in that an arcuate flange 62 extends from body 46b and conceals or covers the peripheral edge 22b of panel 16b to encapsulate a portion of surface 18b and peripheral edge 22b. Arcuate flange 62 again occupies and closes the space between the edge of the vehicle window opening and the window panel and acts to channel debris away from the window opening. This configuration can be reversed in gasket 60' (FIG. 5) so that the flange 64 has the concave portion 66 oriented toward the vehicle interior while the convex portion 68 occupies and closes the space between the vehicle and peripheral edge 22c. The exterior of convex portion 68 provides a flush transition between the vehicle sheet metal exterior and surface 20c of panel 16c.

Yet another embodiment of a gasket 69 (FIG. 6) includes a bulb seal 70 extending from body 46d and outer flange 54d to occupy the gap between the edge of the vehicle window opening and the window panel.

Each of the embodiments are shown as examples and are not intended to be exhaustive or otherwise limit the scope of the invention. Each may be formed from a variety of melt-processing techniques including the preferred techniques of injection molding, compression molding, blow molding, or extrusion from a melt-processable material having the characteristics described below. Furthermore, the gasketed assemblies of this invention may be made by forming the gasket using a melt-processing technique (such as by injection molding) along with any accompanying attachment member, in a mold separate from the window glass panel, thereafter locating the panel on the formed gasket and forcing the gasket against the panel to promote gasket-to-panel adhesion, such as is described in commonly assigned U.S. Pat. No. 5,443,673, the disclosure of which is incorporated herein by reference.

Figure 2:
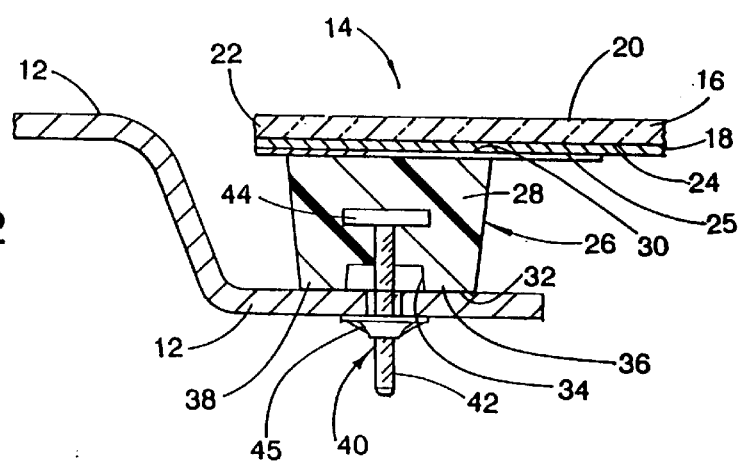
FIG. 2 is a section view through the peripheral edge of the window panel showing an attachment member in the window panel gasket and passing through a flange forming the window opening.

In one or more of the embodiments described above, it is contemplated and preferred that prior to placing or forming the gasket on the window panel, the surface of the panel and/or gasket receives a primer or adhesion-promoting compound 25 (FIG. 2). Such primers or adhesion-promoting compounds improve adhesion of the gasket to the window panel. Typically, such primers or compounds 25 are applied to surface 18 (FIG. 2) or to surface frit layer 24 thereon prior to receiving gasket 26. One example of such a compound has an acrylic base including an epoxy component, and may further include an adhesion-promoting agent such as a silane coupling agent, a titanium coupling agent, and a zirconium coupling agent. Such primers will be identified below in greater detail.

Gaskets 26, 46, 60, 60', and 69, contemplated to be used in accordance with this invention, are made from a melt-processible material which requires the application of heat to mobilize or melt the material. Heat is required to process the melt-processible material under conventional molding techniques such as injection molding, extrusion, blow molding, compression molding, and similar techniques.

In one embodiment of the method, a panel is provided with or without a frit layer applied to surface 18. The surface of the panel to receive the gasket is preferably cleaned by wiping with a suitable solvent, such as isopropyl alcohol, which removes oils or other dirt and debris. The alcohol mobilizes any contaminants and evaporates in a short period of time leaving substantially no residue to interfere or degrade the process. Following cleaning of the panel, and after sufficient time has lapsed to evaporate any remaining solvent, a primer adhesive is applied to that portion or greater which will receive a molded gasket. With respect to the embodiments having a gasket such as shown in FIG. 2, it is preferred that application of the primer adhesive be constrained to a linear path on the frit layer proximate the peripheral edge of the glass and have a primer coating thickness within the range of about 0.01 and 5.0 mils, preferably within the range of about 0.1 to 1.0 mils.

In one embodiment, the primer adhesive is applied by a sprayer, wiper, roller, extruder, or other technique to the preferred thickness. Since it is anticipated that use of this invention will typically involve production of a large number of panels, an automated application technique is preferred. One automated process is by a robotic applicator which extrudes a precise coat of the primer adhesive to a defined portion of the panel. To accurately reproduce the robotic application of the primer adhesive, conventional robotic devices and accurate positioning of the panel in reference to the robotic applicator are used.

Subsequent to the application of the primer adhesive, it is preferred that the primer adhesive be heated to a temperature greater than 250° F., and most preferably to a temperature between 250° F. and 350° F., usually 325° F., such as described in commonly assigned U.S. Pat. No. 5,544,458, the disclosure of which is incorporated herein by reference. By heating to about 325° F., sufficient heat is retained in the panel, primer, and the frit layer so that the temperature will be above 250° F. after transfer of the panel from the heat source to a mold assembly and during the molding process. It has been found that by heating the panel and adhesive primer to a temperature greater than 225° F. and maintaining that temperature up through the time the gasket is formed on the panel, an exceptionally strong bond and water resistant barrier is formed between the panel and the gasket. The minimum temperature for a primer adhesive at which such a bond occurs is known as the "primer transition temperature." The primer transition temperature may also be defined as that temperature for a given primer where the adhesive quality significantly changes.

TABLE I

| Manufacturer | City, State | Designation |
| --- | --- | --- |
| B. F. Goodrich | Akron, OH | A-1100-B plus A-1167-B at 20:1 ratio |
| Donnelly Corp. | Holland, MI | A-57 (includes silane coupling agent) |
| B. F. Goodrich | Akron, OH | EXP-541 plus EXP-535 at 20:1 ratio |
| Donnelly Corp. | Holland, MI | A-47 (includes silane coupling agent) |

Adhesive primers such as identified above in Table I, exhibit a significant improvement in adhesion after being heated to a temperature greater than its transition temperature (usually at least 200° F.). and receiving the molded gasket after heated to that temperature. For the primers identified in Table I, the primer transition temperature is generally above 200° F. A better understanding of the improved adhesive characteristic and primer transition temperature definition may be obtained by referring to the graph shown in FIG. 23.

FIG. 23 graphically represents the results of experiments using the primers in Table I in bonding a gasket to a single surface of a glass panel such as 16 having a frit layer 24 thereon. The abscissa or X-axis is a plot of the temperature to which panel 16 and each primer 25 was heated to prior to the time the gasket was molded thereon. The ordinate or Y-axis of the graph is the number of hours the gasket survived shear and peel tests after soaking in water having a temperature of 80° C. Points were plotted when the cohesive character of the gasket failed, but not if the bond between the panel and the gasket failed. Cohesive failure occurred when 80 percent or more of the gasket was retained on the panel when subjected to both shear and 90° peel tests. Presently, the most stringent standard known to be followed by automobile manufacturers is 100 hours. That is, the bond between a gasket and panel should survive a minimum of 100 hours in the 80° C. water soak, and, preferably, at least 200 hours 80° C. water soak.

To provide consistent results, shear tests were conducted on gaskets bonded to a glass plaque, each gasket having a length of approximately 1.0 inch, 0.75 inch wide, and 0.50 inch thick. The shear tests were conducted transversely to the long axis of the gasket at a rate of 25 millimeters per minute. Peel tests were conducted on gaskets 0.75 inch wide, 0.50 inch thick, and of a length sufficient to pull one end 180° back along the gasket at a rate of 25 millimeters per minute.

As seen in the graph, substantially every adhesive primer has an improved adhesive quality at a temperature above 200° F. with the exception of conventional primers that are water-based urethanes (curve E). For the adhesive primer designated A-1100 (curve B), a noticeable increase in the slope of the curve occurs around 250° F., and the slope shows another significant change around 290° F. The adhesive primer designated A-47 (curve D) follows a similar curve as does the preferred adhesive primer A-57 (curve C). Adhesive primer 541 (curve A) obtains its maximum adhesion when heated to approximately 250° F., but shows a noticeable change in the slope of its curve at approximately 200° F.

Immediately following any heating of the panel, frit layer, and the adhesive primer layer to a temperature greater than or equal to the primer transition temperature, the panel is transported from the heater and loaded into a mold assembly. In the case of injection molding, the mold assembly is closed about the panel. One option available before loading the panel is to load any locating or mounting hardware such as studs, bezels, etc. in the mold cavity so that it will be positioned and/or at least partially encapsulated by the molded gasket as will be seen below. Various ways of loading and locating the mounting hardware in the molding apparatus are known.

Many thermoplastic materials, such as PVC in general, are either homopolymer or random copolymer in character. Furthermore, such materials have only a single-phase morphology which is poorly suited for the objectives of the present invention. Melt-processible materials having a multi-phase morphology provide the desired characteristics. The multi-phase morphology of a particular melt-processible material can be determined by several techniques including microscopy (e.g., such as by using a transmission electron microscope) and preferably through the use of dynamic mechanical analysis (DMA), the output of which is best illustrated graphically by plotting the logarithm of the elastic storage modulus for a given material along the ordinate versus the temperature along the abscissa. An example of a suitable dynamic mechanical analyzer is a DMS-110 available from Seiko Instruments USA, Inc. of Sappington, Mo.

Figure 7:
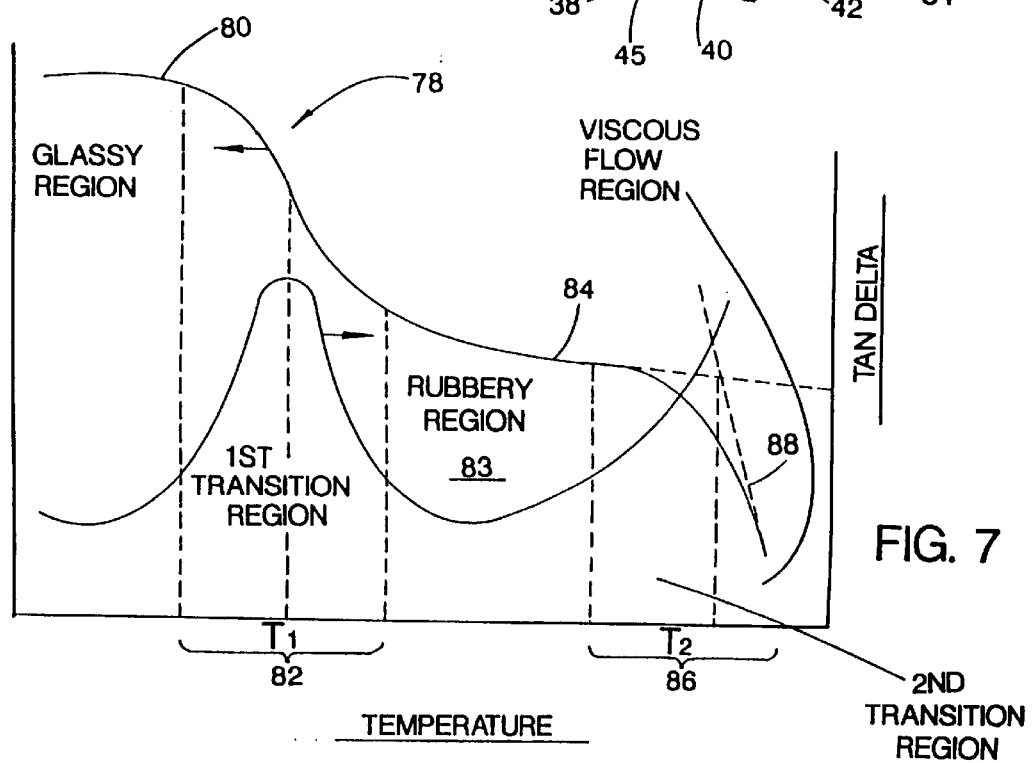
FIG. 7 is a graph illustrating the elastic storage modulus versus temperature curve for a model material having a multi-phase morphology.
Figure 3:
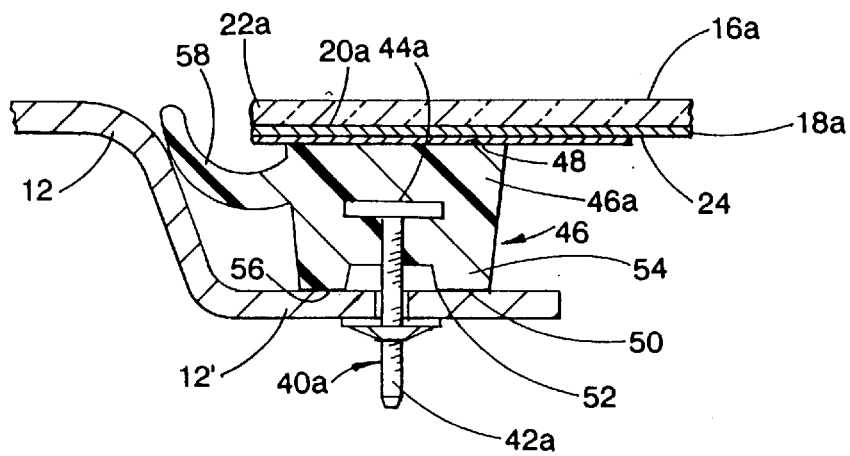
FIGS. 3–6 illustrate alternative profiles of various single-sided and two-sided encapsulant gaskets in accordance with this invention.
Figure 4:
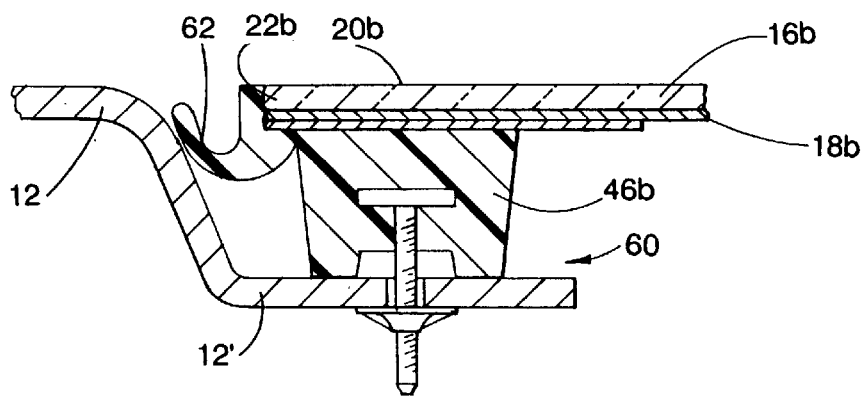
Figure 5:
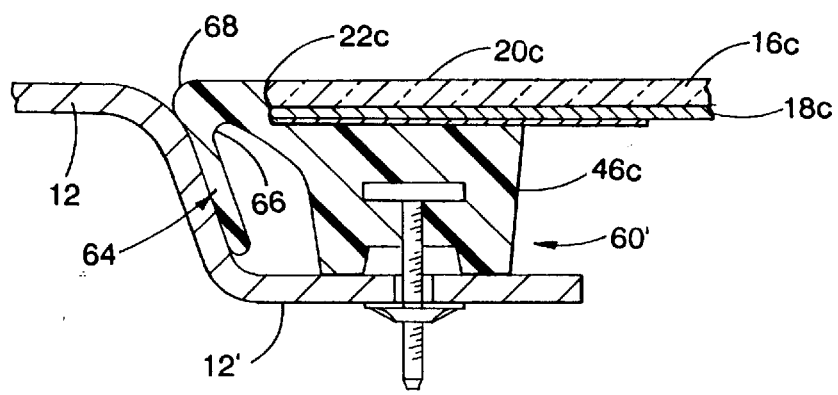
Figure 6:
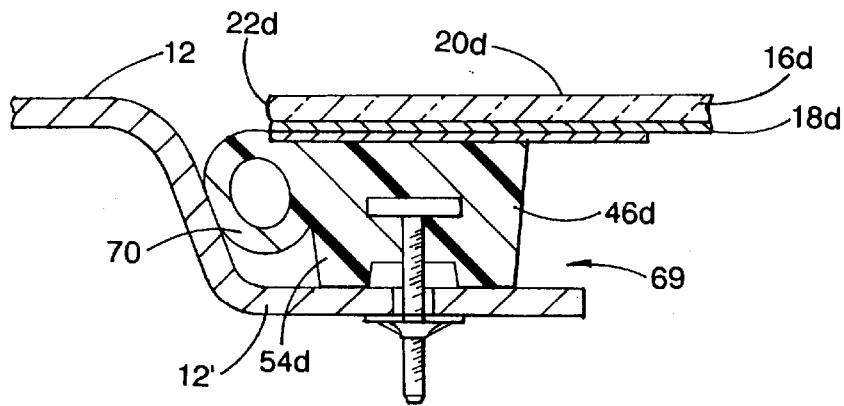
Figure 8:
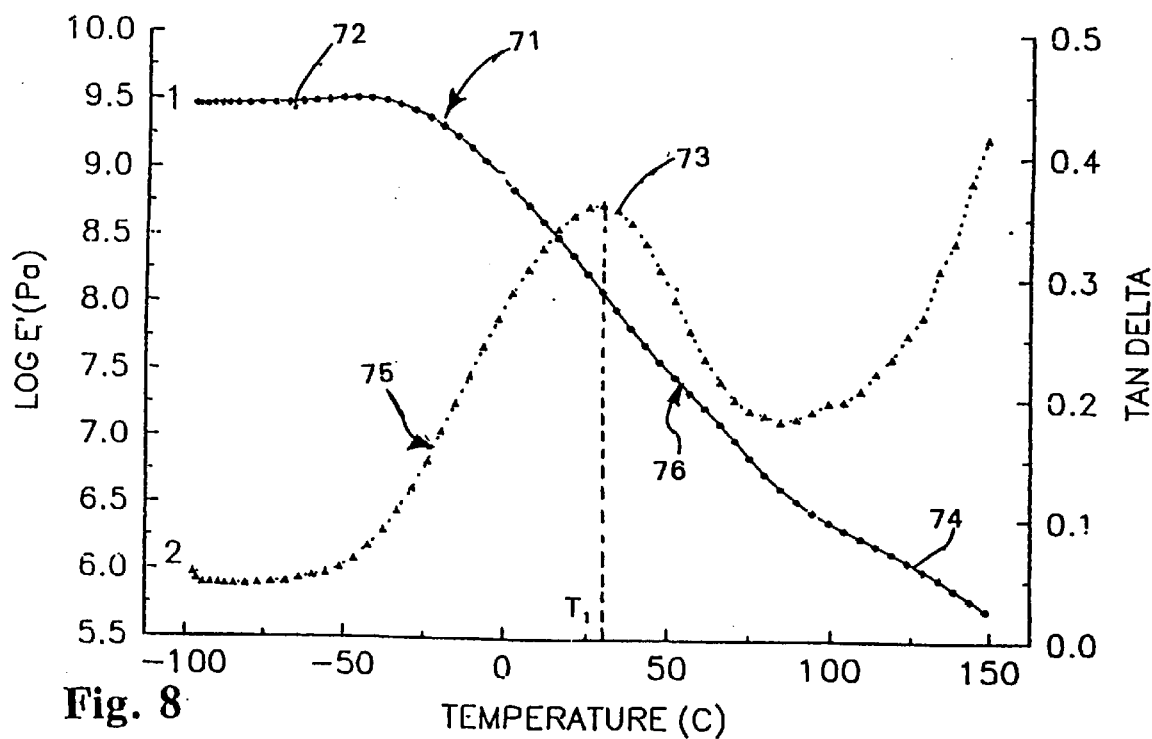
FIG. 8 is a graph illustrating the elastic storage modulus versus temperature for conventional PVC (single-phase) gasket material.

The DMA curve for a melt-processible material having a multi-phase morphology would approximate that shown in FIG. 7 where the logarithm of the elastic storage modulus is plotted against temperature to define the curve 78 having a glassy region 80 leading to a rubbery region 83 exhibiting a rubbery plateau 84, in turn, leading to a viscous flow region 88. The region 82 between the glassy region 80 and the rubbery region 83 is marked by the first thermal transition temperature ($T_1$) where the character of the material changes from a state exhibiting significant rigidity to a state exhibiting significant flexibility. The flexible state is maintained through the rubbery region until the second thermal transition temperature ($T_2$) is reached. The second thermal transition temperature occurs between the rubbery region 83 and the viscous flow region 88, where the character of the material changes from a state exhibiting significant flexibility to a state exhibiting significant viscous flow. The second thermal transition temperature is determined by a tangent intersection method. In this method, a tangent is drawn along the portion of the curve defining the rubbery region and including as many points of the rubbery plateau curve as possible. A second line is drawn tangential to the viscous flow region of the curve to intersect the tangent line extending from the plateau. The intersection point of these two lines defines the second thermal transition temperature. Ideally, for the vehicular applications of the present invention, the first thermal transition temperature would occur below 24° C., preferably below 0° C., and most preferably below −20° C. The second thermal transition temperature should occur at a temperature greater than 60° C., preferably above 80° C., and most preferably above 100° C. Such temperatures provide the desired rubbery plateau over the typical vehicle operating temperature range of −40° C. to 100° C. The rubbery plateau between the two transition temperatures should encompass a minimum elastic storage modulus greater than 2 million Pascals, and most preferably greater than 3 million Pascals.

Suitable multi-phase morphology, melt-processible materials generally include block copolymers such as styrene/butadiene/styrene (SBS) elastomers, styrene/ethylene/butadiene/styrene (SEBS) elastomers, copolyester elastomers, polyether block amides, and thermoplastic urethanes. Suitable multi-phase melt-processible materials also include physical blends and alloys such as polypropylene and EPDM, of polyvinylendene chloride and ethylene vinyl acetate, thermoplastic olefins and EPDM, and PVC and nitrile rubber. Another class of suitable multi-phase melt-processible materials includes multi-phase graft copolymers such as methacrylate/butadiene/styrene (MBS). Also, blends of the above polymers among themselves or with another polymer can also be suitable materials according to this invention.

Examples of multi-phase morphology block copolymers are KRATON™ D (which is SBS) and KRATON™ G (which is SEBS), both available from Shell Chemical Company, Troy, Mich.; HYTREL™ (a copolyester elastomer), available from DuPont Chemical, Wilmington, Del.; PEBAX™ (a polyether block amide), available from Elf Atochem North America Incorporated, Philadelphia, Pa.; ELASTOLLAN™ (a thermoplastic urethane), available from BASF, Wyandotte, Mich.; and PELLETHANE™ (a thermoplastic urethane), available from Dow Chemical Company, Midland, Mich.

Examples of physical blends and alloys include SANTOPRENE™ (a blend of polypropylene and EPDM), available from Advanced Elastomers, Auburn Hills, Mich.; ALCRYN™ (a blend of polyvinyledene chloride and ethylene vinyl acetate), available from DuPont Chemical, Wilmington, Del.; CHEMIGUM™ (a blend of PVC and nitrile rubber), available from Goodyear Tire and Rubber Company, Akron, Ohio; VINYPRENE™ (a blend of PVC and ethylene terpolymer), available from Vista Chemical Company, Houston, Tex.; 93-X 0401 A-80 (a blend of polypropylene and EPDM), available from Teknor Apex Company, Pawtucket, R.I.; and SARLINK™ 3000 (a blend of polypropylene and EPDM), available from DSM Thermoplastic Elastomers Incorporated, Leominster, Mass.

Such melt-processible materials are distinguishable from gasketing materials which are not melt-processible, such as those used in liquid injection molding processes, i.e., RIM urethanes. This invention encompasses a method for selecting melt-processible materials for forming gaskets which provide superior adhesion characteristics when subjected to prolonged periods of both static and dynamic loads.

In contrast, for a typical single-phase morphology material, such as VISTA™ brand 484.51 plasticized PVC, available from Vista Performance Polymers of Jeffersontown, Ky., the DMA graph (FIG. 8) is a curve 71 lacking a well-defined rubbery plateau, as indicated by the steadily declining curve portion 76 between the glassy region indicated by portion 72 and the viscous flow region indicated by curve portion 74. Such a curve is characteristic of a material having a single thermal transition temperature ($T_1$) but lacking, within the range of automotive interest between about −50° C. to about +150° C., a second transition temperature ($T_2$) as described above. The single thermal transition temperature is established by the location of a peak 73 on a curve 75 formed from a plot of Tan δ versus temperature. Tan δ is defined as the ratio of E" to E', where E' is the elastic storage modulus and E" is the loss modulus of the material. If there is more than one peak in Tan δ versus Twithin the first transition region, the most prominent peak establishes the thermal transition temperature.

Alternatively, it may be desirable to use melt-processible materials that are cross-linkable such as by vulcanization. Cross-linking can be achieved by incorporating reactable sites in the melt-processible polymer backbone of the polymer formulation and/or by adding reactable moieties to the polymer formulation itself which are thereafter incorporated into the molded gasket network during the cure phase of the molding process itself. Reactable sites incorporated in the polymer backbone are commonly in the form of unsaturation and are incorporated during polymerization of the starting monomers of the polymer by adding monomers containing multiple sites of unsaturation such as butadiene, isoprene, dicyclopentadiene, ethylidene norbornene, hexadiene, etc. Examples of cross-linking means that are reactable moieties added to the polymer formulation include peroxides such as dicumyl peroxide.

Examples of melt-processible gasketing material with a cross-linked structure formed from formulations with unsaturation in the polymer backbone are styrene butadiene rubber (SBR) elastomer and ethylene propylene diene terpolymer (EPDM) elastomer. Cross-linking between sites of unsaturation on adjacent polymer chains is achieved preferably via sulfur vulcanization as is commonly known. An example of a gasketing material formed from a formulation that is a peroxide cross-linkable system is ethylene propylene copolymer (EPM) elastomer.

In such cross-linkable melt-processible materials it is further desired that during the formng process, the molding material does not cross-link appreciably in its melt phase (such as within the barrel of an injection molding apparatus), but once injected into the mold and filling the mold cavity, cross-links quickly, such as by vulcanization, to form the gasket. To achieve this in an injection molding process, the temperature of the cross-linkable material in the injection barrel is maintained at a relatively low temperature of around 100° C. to 120° C. such that the cross-linkable melt-processible material does not gel in the barrel. By contrast, the mold temperature is maintained around 150° C. to 220° C. (preferably, around 180° C. to 200° C.) so that as soon as the material fills the mold cavity, but not appreciably before, it cross-links to take the form of the cavity. Once cross-linking is substantially underway within the filled mold cavity, it is further desirable that the curing time in the mold cavity be short, between 1 and 8 minutes (preferably between 1 and 5 minutes, and most preferably between 1 and 3 minutes) so as to minimize residence time within the mold. Longer curing residence time within the mold can make the cycle time undesirably long, thus adding cost to the finished window assembly.

MOLD APPARATUS

To reduce the cycle time per molded part, it is conventional in the art to use multiple side-by-side cavity molds. For example, a double side-by-side cavity mold 90 can be used (FIG. 18) for producing modular windows. From the force diagram, it can be seen that a double side-by-side cavity mold 90 would require twice the clamp tonnage needed for a single cavity mold 92 (FIG. 17) to keep it closed during the injection cycle. This increased clamp tonnage can be a disadvantage, especially for large-sized windows (such as the type described in Example 1) that are used as side and rear windows on automobiles, minivans, light trucks, and the like, which may require clamp tonnages in excess of 1,500 tons for a double side-by-side cavity mold 90. Such large hydraulic clamp tonnage presses are expensive. In addition to this, the sheer size of such automobile windows could require overly large plate sizes and associated plates for a multiple side-by-side cavity mold which could require custom fabrication, extra floor space, and disadvantageous cost.

Figure 19:
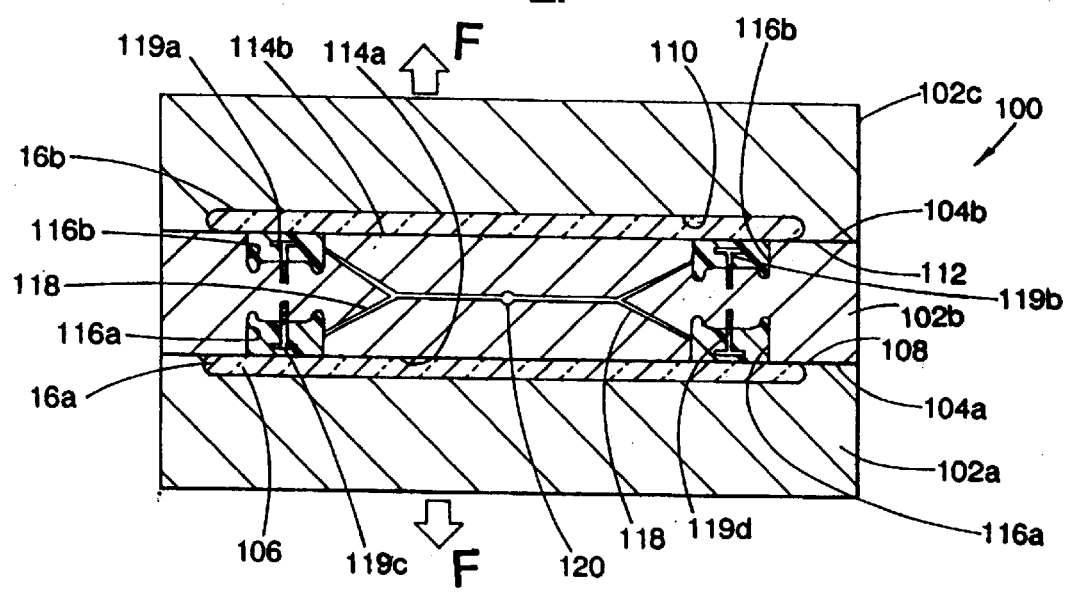
FIG. 19 is an elevational section view of yet another embodiment of an injection mold apparatus suitable to insert mold a static spacer, or gasket simultaneously on two glass panels, and illustrating attachment members suspended in the mold cavity.

To overcome these disadvantages, a novel stacked-cavity molding concept to produce large area modular windows is schematically shown in FIG. 19. The novel stacked-cavity mold 100 for molding modular window assemblies overcomes the deficiencies of the conventional side-by-side cavity mold 90 shown in FIG. 18. Mold 100 can receive multiple panels of glass 16a, 16b without being larger in lateral dimension. By doing so, the effective size of the mold plates 102a, 102b, and 102c remain the same as the conventional single cavity mold 92 shown in FIG. 17. Also a comparison of the force diagrams in FIGS. 17, 18, and 19 reveals that the total clamp tonnage needed for the stacked-cavity mold design 100 will be substantially equal to the clamp tonnage needed for the single cavity mold 92 in FIG. 17 and about half that of the side-by-side cavity mold arrangement 90 in FIG. 18.

The stacked-cavity mold configuration 100 of FIG. 19 includes lower, middle, and upper plates 102a, 102b, and 102c, respectively separated from each other by lower and upper parting lines 104a, 104b, respectively. Lower plate 102a includes a cavity 106 formed in its upper surface 108 to receive a panel of glass 16a or other panel-like material. Although cavity 106 is shown as being relatively planar, this is by way of example only and may be configured to accept any desired curved or shaped panel. It is specifically contemplated that cavity 106 may be configured to receive a curved sheet of glass or other material for use as a vehicle window. In the embodiment shown, upper plate 102c may be a mirror image of plate 102a, such that a mold cavity 110 is defined in a lower surface 112 of plate 102c and configured to receive a sheet of glass 16b therein. Disposed between plates 102a and 102c is middle plate 102b having a lower and upper surfaces 114a, 114b respectively configured to engage and seal with surfaces 108 and 112, respectively, when clamped together as shown. For window encapsulations, middle plate 102b may include mirror image mold cavities 116a, 116b defined in surfaces 114a, 114b respectively shaped to form the desired gasket profile. Alternatively, two different modular window assemblies can be molded in tandem using the stacked-cavity molding apparatus of this embodiment. This is particularly useful when molding left-hand side windows and right-hand side windows for vehicles where the left- and the right-window assemblies, though generally similar, are not symmetric. Molding in tandem, such as in the stacked-cavity mold of FIG. 19, enables fabrication of both window assemblies of the set with a molding cycle time per part approximately half the conventional cycle time per part where the conventional single-cavity mold of FIG. 17 be used. Moreover, the tandem molding of the left-side/right-side modular window set facilitates ease of inventory and stock control within a manufacturing plant. In the embodiment shown in FIG. 19, cavities 116a, 116b produce a gasket profile similar to gasket 26 shown in FIG. 2. Each of the mold cavities 116a, 116b are in fluid communication through a series of runners 118 with a sprue 120 which, in turn, receives a nozzle (not shown) of a conventional plastic injection machine. Preferably, sprue 120 and runners are centrally located and configured within middle plate 102b so that the melt-processible material is injected into cavities 116a, 116b uniformly.

The vertical configuration of the stacked-cavity mold 100 has the further advantage that panels 16a and 16b are gravity-supported on plates 102a and 102b, respectively, with consequent ease of loading and alignment without need for vacuum assists and the like. Similarly, studs 119a and 119b can be gravity-supported when loaded into the mold cavity prior to injection molding. Suitable support means such as magnetic retention, clamping, vacuum assist, and their like can be used to secure, position, and align studs 119c and 119d in the mold cavity prior to injection molding of the melt-processible material.

Figure 20:
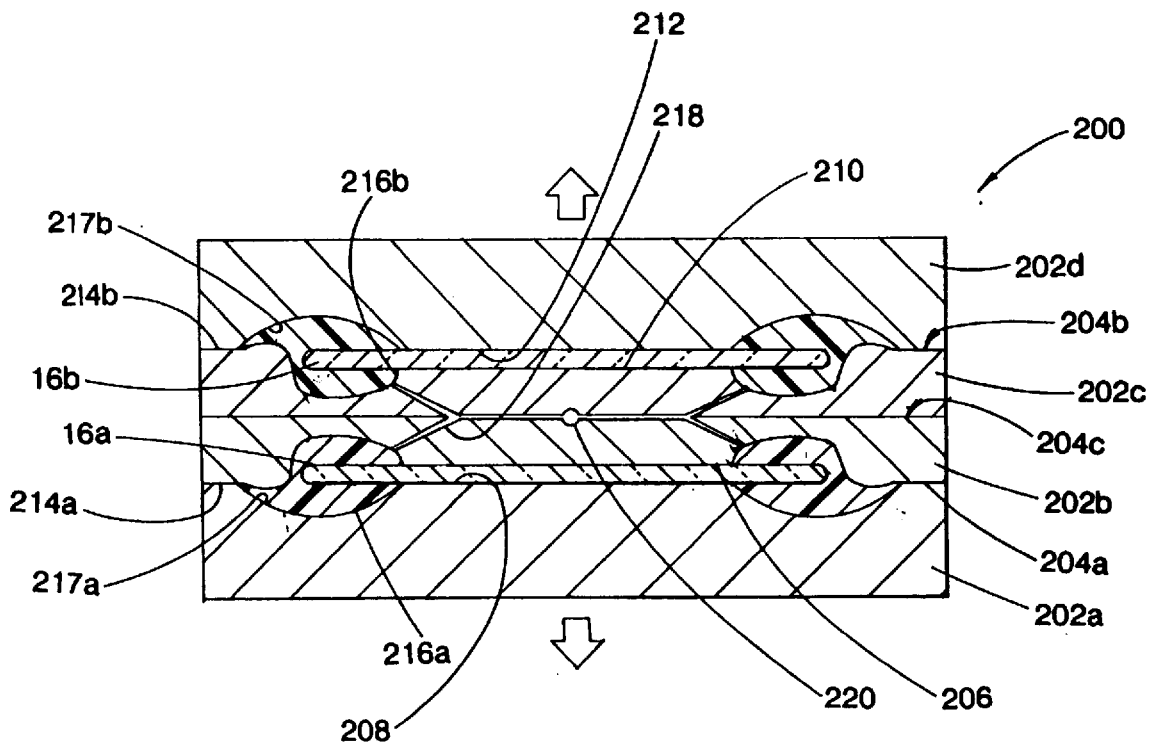
FIG. 20 is an elevational section view of yet another embodiment of an injection mold apparatus suitable to insert mold three-sided encapsulations simultaneously about at least two glass panels.

FIG. 20 shows an alternate embodiment of stacked-cavity mold 200 incorporating a third parting line 204c, splitting the middle plate into two components shown here as 202b, 202c. Provision of parting line 204c facilitates removal of the runner 218 and sprue 220 after each cycle. Additionally, the lower and upper plates 202a, 202d, respectively, have been configured along surfaces 208 and 212 to form mold cavities 217a, 217b, which cooperate with mold cavities 216a, 216b, respectively, to form a three-sided encapsulation about the peripheral edge of glass panels 16a, 16b. To locate each glass sheet 16a, 16b with respect to each mold cavity assembly such as 216a, 217a, the cavity 206, 210 to receive each sheet of glass may be defined in one or both of the plates such as 202a, 202b. As shown in FIG. 20, cavities 206, 210 are configured in the lower surface 214a of plate 202b, and the upper surface 214b of plate 202c.

Figure 21:
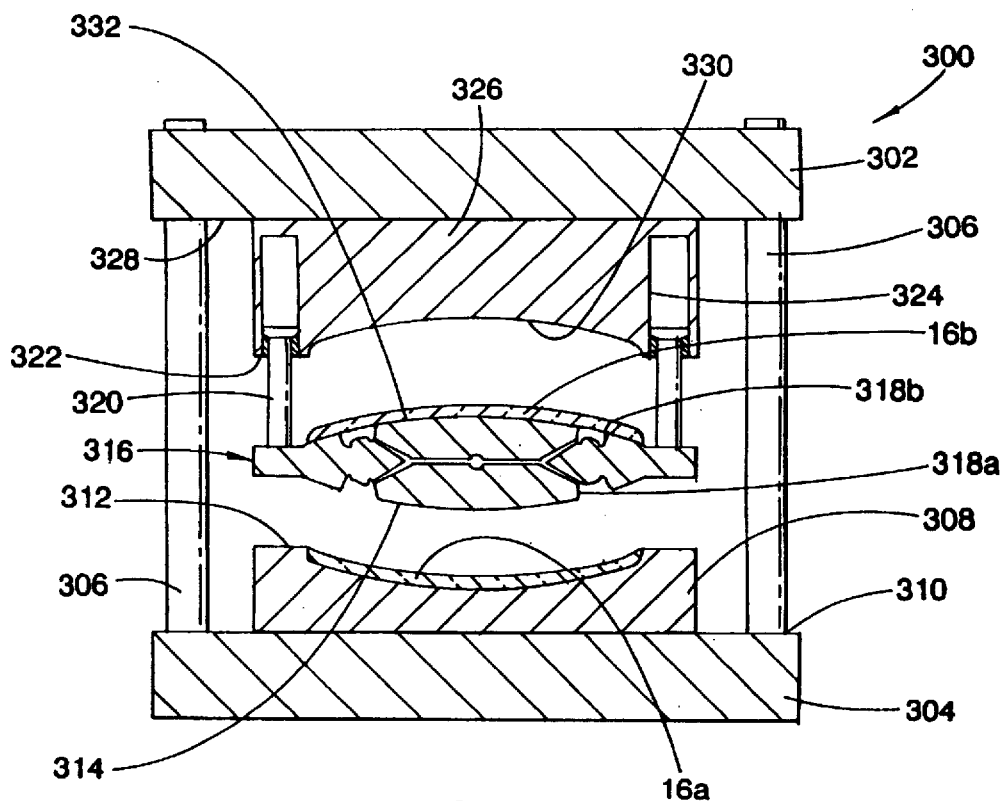
FIG. 21 is an elevational section view illustrating one embodiment of a stacked-cavity injection mold apparatus used to simultaneously form the static spacer or gasket on at least two vehicle window panel assemblies and how each window panel is located within the mold.

Yet another embodiment of a stacked-cavity mold 300 is shown in FIG. 21. In this configuration, a top and bottom platen 302, 304 respectively are interconnected by at least two tie rods 306. One platen (such as 302) moves along tie rods 306 with respect to the other platen (304) as is well-known in press machinery and the like. A lower mold plate 308 is disposed on an upper surface 310 of platen 304 and itself having an upper surface 312 configured to cooperate and seal with a lower surface 314 of a middle plate 316 to accommodate a sheet of glass 16a and form the mold cavity 318a along one surface or about the peripheral edge of the glass. Middle plate 316 is, in turn, suspended by guide pins 320 slidably retained by bushings 322 in cylindrical holes 324 defined in an upper plate 326. Upper plate 326 is mounted to the lower surface 328 of top platen 302. Upper plate 326 also has a lower surface 330 which cooperates with an upper surface 332 of middle plate 316 to accommodate a sheet of glass 16b, and form the mold cavity 318b adjacent the glass surface and/or edge. As in the previous embodiments, glass panels 16a, 16b may be located in the mold using conventional locating pins, springs, or the like.

The stacked-cavity mold design, such as shown in FIGS. 19–20, is particularly useful for cross-linkable melt-processible material which typically requires a longer cycle time due to the cross-linking step in the mold. For such materials, the stacked-mold configuration of this invention greatly enhances productivity and economic manufacturing. For example, a stacked-cavity mold will potentially reduce the cycle time per molded part by almost one-half compared to a single cavity mold.

The opening and closing to insert and remove the glass can be accomplished in several ways. Referring to FIG. 21, middle plate 316 can be attached to either the top or the bottom plates 326, 308 and can be guided by guide pins, hydraulic cylinders, or the like 320. Alternatively, a hinge mechanism such as a scissors mechanism (not shown) can also be used with the top or the bottom plate 326, 308 to control the movement of the middle plate 316. It is preferred that middle plate 316 is attached to the top plate 326. FIG. 21 shows that middle plate 316 is attached to the top plate 326 using suitably long guide pins 320. In this configuration, upon opening the mold 300, middle plate 316 will separate from top plate 326 under its own weight. FIG. 22 shows an example of a stacked-cavity molding process. When at the fully open mold position, multiple glass panels 16a, 16b and other accessories are mounted in the stackedcavity mold. Following that, mold 300 closes and the melt-processible gasketing material is injected into the mold cavities 318a, 318b. Upon filling of the mold and substantial completion of any cross-linking reactions in the gasketing material, the mold is opened. The partially open position of FIG. 22c illustrates that upon mold opening, the first separation takes place between the top plate 326 and the middle plate 316 until complete separation is attained. After that, and upon further movement of the top platen 302, separation between middle plate 316 and bottom plate 308 starts and continues until the mold is fully open. The molded window assemblies 16a, 16b are then removed from the stacked-cavity mold which is then ready for another set of glass panels and accessories in a new cycle. This type of mold opening and closing mechanism is uncomplex and economical.

Plates 308, 316, and 326 can be made of the same or different materials. Suitable materials include tool steel and composites such as filled epoxy. When molding cross-linkable polymer formulations, such as during formation of EPDM gaskets, it is desirable that the mold be heated, such as to 150° C. to 220° C. or thereabouts. In this regard, it may be desirable to use plate materials, and especially, for economy, a middle plate material, that has a high thermal conductivity. Preferably, a plate material is selected that has a thermal conductivity, as heated in the mold, greater than about 80 watts/metre.K, and more preferably greater than about 100 watts/metre.K, and most preferably greater than about 120 watts/metre.K. Suitable materials include copper alloys such as copper-beryllium alloy, aluminum, aluminum alloys, and their like.

Such a stacked-cavity mold configuration is suitable to produce any large area flush glazing windows. Further, such stacked-cavity mold configuration is also useful to produce three-sided encapsulation window assemblies and especially when molding in cross-linkable, melt-processible materials such as EPDM, SBR, and their like.

The stacked-cavity mold configurations shown in FIGS. 19–22 illustrate mold opening and closing in the vertical direction. Similar stacked-cavity mold configuration can also be used, with appropriate modifications, for a horizontal molding operation to fabricate modular windows where mold opening and closing will be in the horizontal direction.

To demonstrate the effectiveness of the method of selecting the appropriate material for forming the gaskets according to this invention, several window panel assemblies were manufactured using melt-processible materials exhibiting a multi-phase morphology, or that are cross-linkable, and selected from the materials described above.

EXAMPLE 1

Figure 17:
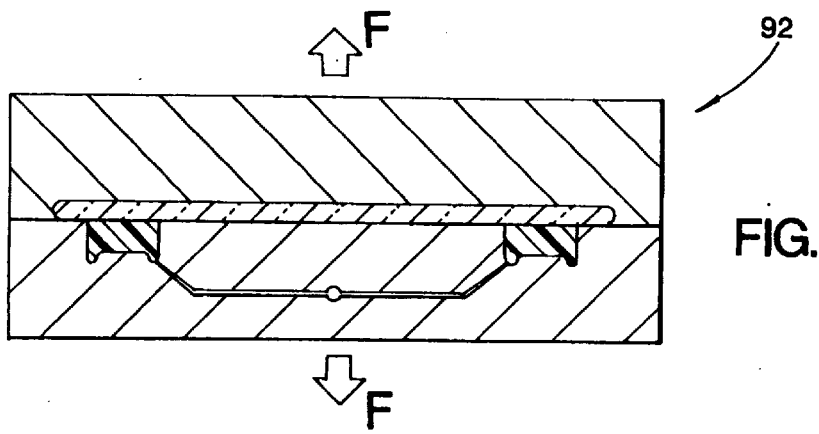
FIG. 17 is an elevational section view through one embodiment of an injection mold apparatus suitable to insert mold a static spacer, gasket, or grommet on a single surface of a window panel.
Figure 18:
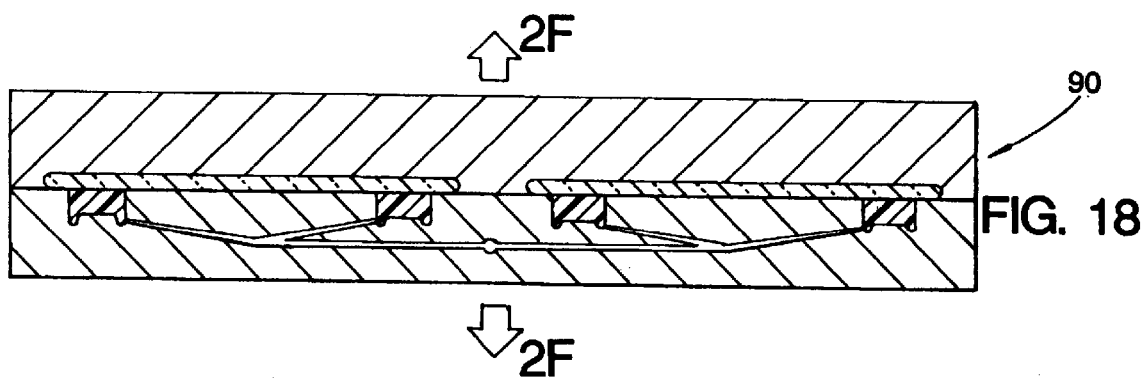
FIG. 18 is an elevational section view of another embodiment of an injection mold apparatus suitable to insert mold a static spacer, gasket, or grommet simultaneously on two glass panels.

A window panel assembly suitable for use as a fixed rear side window on a commercial minivan vehicle, and attached to the vehicle similar to that shown in FIG. 2, included a PVC gasket injection molded directly to the window panel, and a plurality of fasteners in the form of studs partially encapsulated by the PVC and floating therein with respect to the glass surface of the panel. Prior to loading into a conventional single-cavity mold, such as is shown in FIG. 17, the glass panel, which was coated around its perimeter with a ceramic frit blackout layer which, in turn, was primed with A-57 acrylic primer, was preheated to about 325° F. The PVC compound was the VISTA™ brand 484.51 available from Vista Performance Polymers, in Jeffersontown, Ky. The gasket had a width approximately equal to 0.5 inch and a thickness of approximately 0.375 inch, and extended around the entire peripheral edge of the panel over a ceramic blackout frit. The glass panel was about 0.15 inch thick by about 24 inches wide and about 39 inches long and was tempered and of compound curvature. Analysis of the gasket material was conducted on a DMS-110 instrument made by Seiko Instruments U.S.A., Inc. of Sappington, Mo., at a heating rate of 10° C. per minute and a fixed frequency of 1 hertz (Hz). The resulting curve shown in FIG. 8 exhibits no rubbery plateau as defined above and only a single thermal transition temperature occurring at about 30° C. as exhibited by curve 75. The window panel assembly was mounted in a vehicle window opening with the fasteners floating in the encapsulant tightened to 25 inch pounds of torque load and exposed to a temperature of 80° C. for 200 hours. Localized adhesive failure occurred between the single-phase morphology gasket and glass panel underneath many of the mechanical fasteners.

EXAMPLE 2

A gasket of the same dimension as described above and shown in FIG. 2 was injection molded directly to a window panel of similar size using ELASTOLLAN™ SP-806 thermoplastic urethane available from BASF. Prior to molding of the gasket onto the panel, the panel was prepared by priming the surface of frit layer 25 on surface 18 with a wipe of A-57 primer based on acrylics with additional coupling agents available from the Donnelly Corporation of Holland, Mich., followed by an overcoat wipe of AP-134 primer, a solution of silane coupling agents in a low-boiling organic solvent available from the Lord Corp. of Erie, Pa. After formation of the gasket, the window panel was installed on a vehicle window frame with the fasteners tightened to 25 inch pounds of torque load and subjected to an 80° C. temperature for more than 200 hours. The integrity of the bond between the multi-phase morphology gasket and the glass panel underneath the mechanical fasteners was substantially preserved after such testing.

EXAMPLE 3

A gasket, substantially similar to that shown in FIG. 2 and having a size as indicated in Example 1, was injection molded to a window panel of similar size using PEBAX™ brand 3533 polyether block amide available from Elf Atochem North America, Inc. of Philadelphia, Pa. Prior to receiving the gasket, the window panel was primed with a wipe of BETASEAL™ brand 435.18 coupling agent solution, which, in turn, was overcoated with a wipe of BETASEAL™ brand 435.20A urethane-based primer, both available from Essex Chemical Corp. of Sayerville, N.J. After formation of the gasket, the window panel was mounted in a vehicle door frame using the attachment members which were tightened to 25 inch pounds of torque. The window panel assembly was then subjected to temperatures of 80° C. for more than 200 hours. The integrity of the bond between the multi-phase morphology gasket and the glass panel underneath the mechanical fasteners was substantially preserved after such testing.

EXAMPLE 4

A gasket generally the size as described in Example 1, but attached to a 12 by 12 flat, tempered, frit-coated glass substrate and similar to that shown in FIG. 2, was made from SANTOPRENE™ brand 111.73 melt-processible EPDM/polypropylene blend material, by injection molding onto the glass panel which was primed using a wipe of BETASEAL™ brand 435.18 silane coupling agent overcoated with CHEMLOK™ brand 487 primers, available from Lord Corp. Prior to loading into the mold of the injection-molding apparatus, the primed panel was preheated to about 275° F. The window panel was mounted to a simulated door frame section using the stud attachment members floating within the gasket tightened to 25 inch pounds of torque. The window panel assembly was then subjected to 80° C. heat for more than 200 hours. The integrity of the bond between the multi-phase morphology gasket and the glass panel underneath the mechanical fasteners was substantially preserved after such testing.

EXAMPLE 5

A gasket, substantially identical to that shown in FIG. 2, was injection molded from ELASTOLLAN™ brand SP-806 thermoplastic urethane from BASF directly onto a glass panel. The dimensions of the gasket and panel were similar to those in Example 1. Prior to receiving the gasket, the window panel was primed using a wipe of BETASEAL™ brand 435.18 primer followed by an overcoat wipe of BETASEAL™ brand 435.20A primer. Following molding of the gasket onto the panel, a 40 pound weight was suspended from one of the attachment members encapsulated within the gasket. The entire assembly was then subjected to temperatures of 80° C. for more than 200 hours. The integrity of the bond between the multi-phase morphology gasket and the glass panel underneath the mechanical fasteners was substantially preserved after such testing.

EXAMPLE 6

A melt-processible, cross-linkable gasketing material utilizing ethylene propylene diene terpolymer (EPDM) elastomer supplied under the trade name WT-2321 (550-6171) from Burton Rubber Processing Incorporated, Burton, Ohio, was compression molded to a glass panel for 15 minutes compression at 380° F. to form a roughly 1 inch wide by about ⅛ inch thick gasket. Prior to molding, the panel was prepared by priming the frit overcoated glass surface with a wipe of AP-134 primer followed by another wipe (as an overcoat) of primer CHEMLOK™ 250, both available from the Lord Corporation, Pennsylvania. Following molding of the EPDM gasket onto the panel, an 8 pound weight was suspended from the 1 inch wide molded EPDM gasket in a 90° T-peal configuration. The entire assembly was then subjected to a temperature of 80° C. for more than 300 hours. The integrity of the bond between the EPDM gasket and the glass panel was preserved at the end of the test period.

Figure 16:
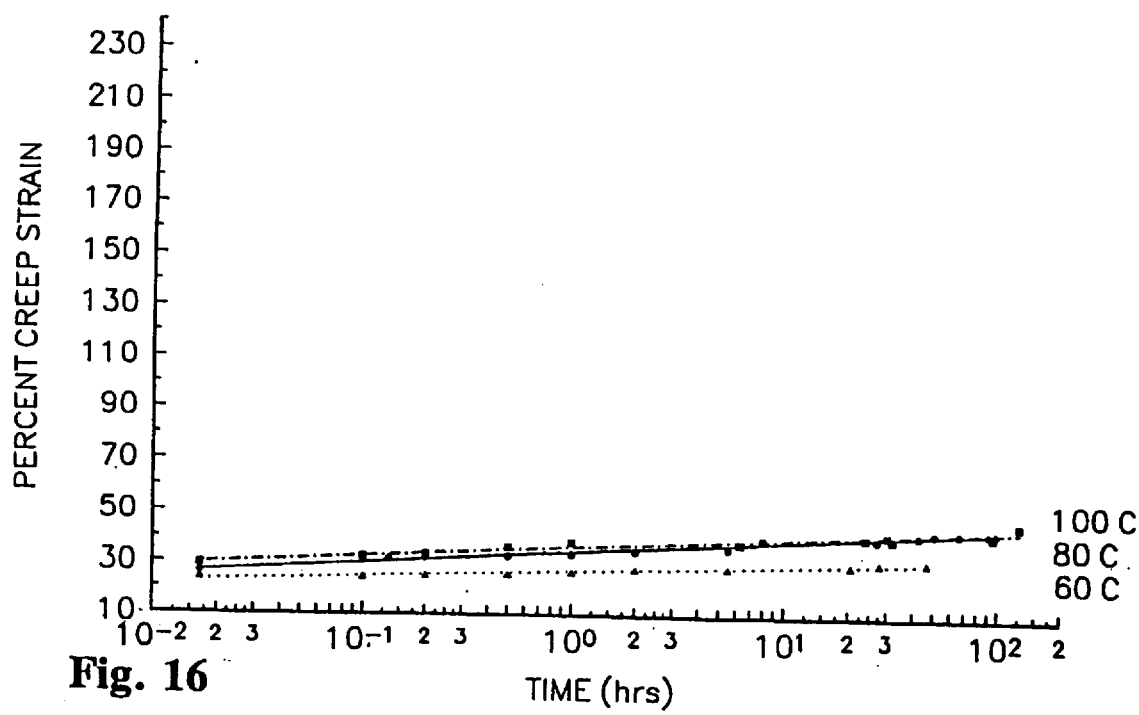

Furthermore, the tensile creep data for the EPDM material, at three different temperatures (60° C., 80° C., and 100° C.), was measured and is shown in FIG. 16. This indicates that the melt-processible cross-linkable EPDM material is not susceptible to tensile creep strain to any great extent, that the creep behavior does not change appreciably with increase in temperature and that EPDM achieves the objectives of the present invention.

EXAMPLE 7

A window panel assembly similar to that shown in FIG. 2 and suitable to use as a fixed side window on a commercial minivan was produced by injection molding PELLETHANE™ brand 2103-80AE thermoplastic urethane (TPU) available from Dow Chemical Company, Midland, Mich. Prior to molding, the TPU was dried, per manufacturer's processing recommendation, to assure a moisture content of less than about 0.02 percent or thereabouts. The molding equipment used was a conventional 700 ton vertical press and was equipped with a single-cavity mold, as schematically shown in FIG. 17. The glass panel for the window assembly was obtained from Acustar Incorporated, McGraw Glass Division, Detroit, Mich. The glass panel was about 24 inches wide, about 39 inches long, and about 0.15 inch thick tempered soda-lime float glass and of a compound curvature. A black ceramic frit blackout layer of roughly between 2 to 4 inches width was also present around the perimeter on the inside (concave) surface of the glass panel. Prior to molding the gasket thereto, the portion of the black frit layer intended to receive the gasket was primed with a wipe of BETASEAL™ brand 435.18 silane solution followed by another wipe (in an overcoat fashion) of BETASEAL™ brand 435.20A urethane based primer, both available from Essex Specialty Products Incorporated, Troy, Mich. The primed glass panel was heated to a temperature of roughly about 325° F. using infrared heaters and was placed into the injection mold. Prior to the placement of the glass panel, 10 metal studs having a rectangular anchor or base of roughly ¾ inch by ⅜ inch dimension with a cylindrical shoulder and with about ½ inch long threaded shaft projecting from the base were mounted in the mold cavity. The studs were located in the mold such that they were about 8 to 12 inches apart from each other. The thermoplastic urethane material was then injected into the single-cavity mold forming the gasket and encapsulating the base and up to the upper rim of the shoulder of all the studs. The studs thus molded had their anchor/base spaced from the glass panel such that the stud floated with respect to the panel, such as is shown schematically in FIG. 2. After completion of formation of the gasket in the mold, the mold was opened and the molded window assembly was removed.

The molded window assemblies were mounted to a simulated minivan vehicle door frame using nuts fastened onto the shafts of the mounting studs embedded in the window gasket. The nuts were tightened to 20 to 30 inch pounds of torque. Such molded window assemblies were subjected to testing appropriate for their intended use in a vehicle. These tests included prolonged heat aging (such as at 80° C. for 300 hours), cold testing (such as storage at −30° F.), exposure to high humidity at elevated temperature, water soak (such as at 80° C. for in excess of 200 hours), thermal cycling, hot/cold vibration, and UV resilience testing in a Xenon weatherometer (SAE J1960, 2500KJ). Upon completion of the various tests, the integrity of the bond between the glass panel and the gasket underneath the studs remained intact. The windows of this example were found to be suitable for use on a vehicle under dynamic and long-term static loads.

Samples of the gasketing materials described above were further analyzed using the dynamic mechanical analysis device described earlier. The samples formed according to Examples 2–5 displayed curves characteristic of multi-phase morphology and exhibited characteristics indicative of two thermal transition temperatures as opposed to the PVC of Example 1, which exhibited the single-phas e morphology curve seen in FIG. 8. Shown in FIGS. 9–12 are DMA curves of the logarithm of the elastic storage modulus plotted against temperature for each separate material used in Examples 2–5. Following the dynamic mechanical analysis, each of the materials were tested using the American Society of Testing Materials Standards protocol for tensile creep. The testing standards are set out in detail in ASTM Designation D 2990–91 approved Nov. 15, 1991, and published by ASTM in January 1992, the contents of which are incorporated herein by reference.

Figure 9:
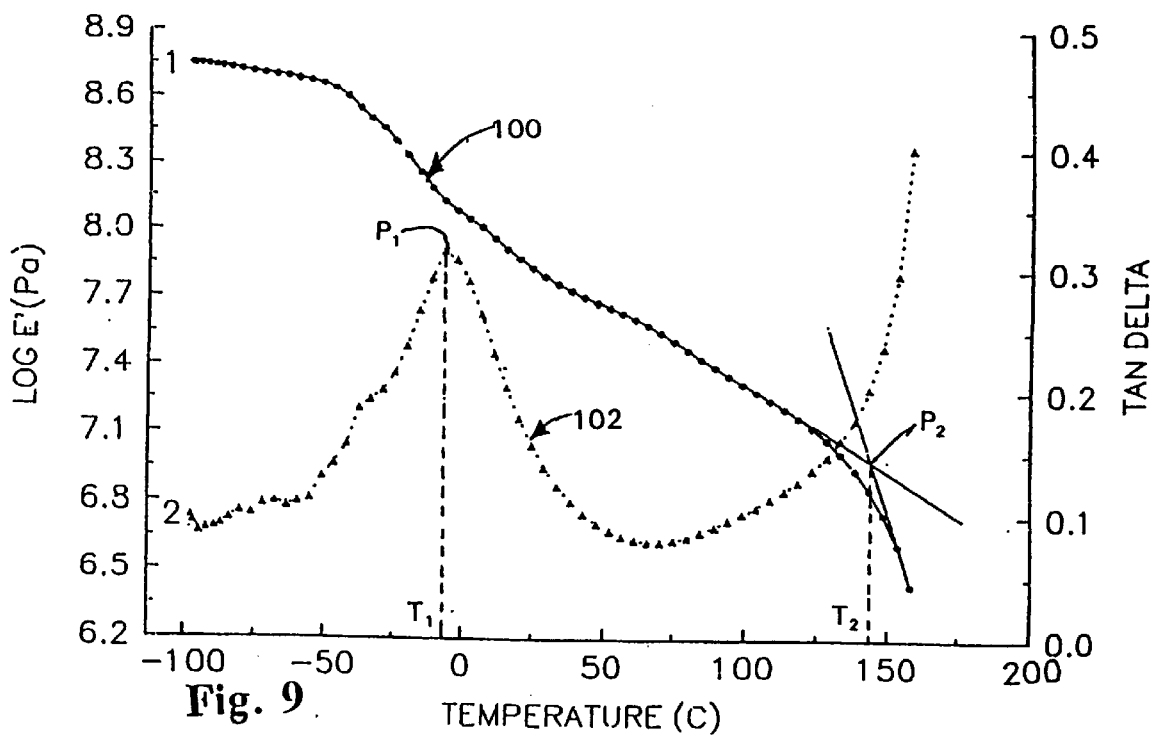
FIGS. 9–12 illustrate multi-phase morphologies of several materials.

Referring to FIG. 9, curve 100 is a plot of the logarithm of the elastic storage modulus for ELASTOLLAN™ brand SP-806 thermoplastic urethane versus temperature, while curve 102 is a plot of Tan δ (i.e., TAN DELTA) against temperature. Using the above method, the lower thermal transition ($T_1$) is established by the peak ($P_1$) of curve 102 which indicates the transition between the glassy region and rubbery region of the material and occurs at about −7° C. This point also establishes the lower extent of the region encompassed by the rubbery plateau. The higher thermal transition temperature ($T_2$) is established by the tangent intersection method and occurs at approximately 144° C. and designated $P_2$. Point $P_2$ defines the uppermost extent of the region encompassed by the rubbery plateau of curve 100.

Figure 10:
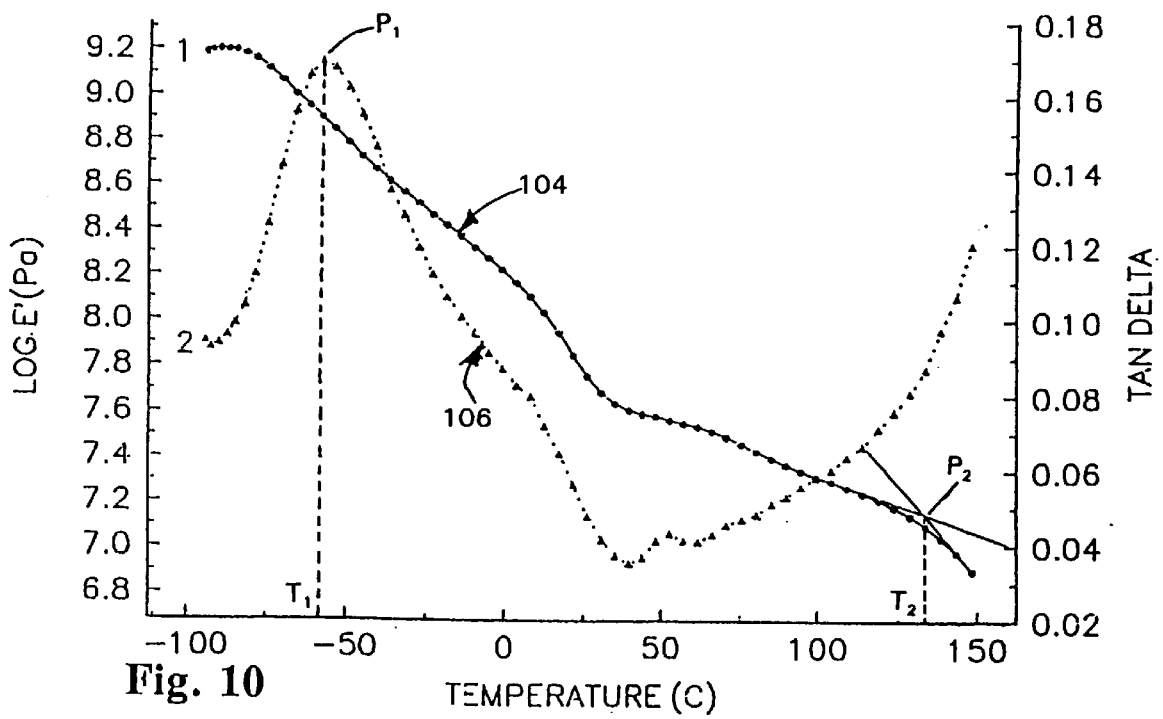

FIG. 10 illustrates a similar plot for HYTREL™ HTR brand 8122 block copolymer material. In this example, the lower thermal transition temperature $T_1$ occurs below −50° C. at about −58° C. marked by peak $P_1$ in curve 106 (Tan δ versus temperature) and indicating the lower extent of the reaion encompassed by the rubbery plateau o n DMA curve 104. The upper thermal transition temperature $T_2$ occurs above 125° C. at about 134° C. marked by point $P_2$ established by the tangent intersection technique.

Figure 11:
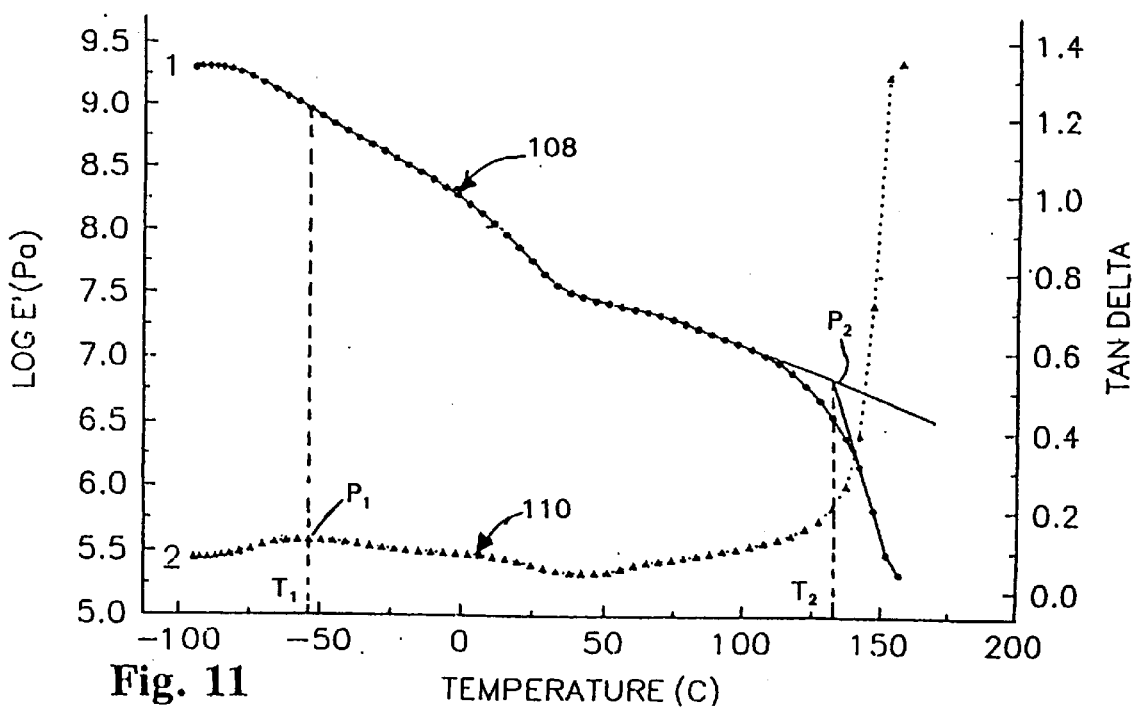
Figure 12:
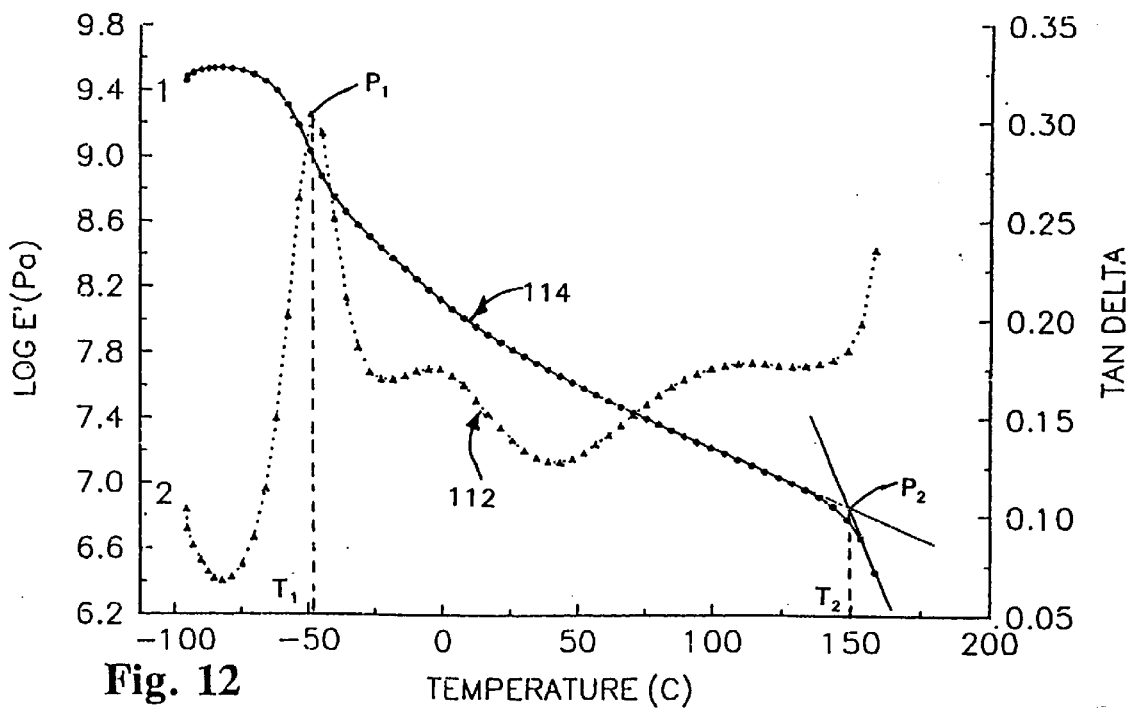

The logarithm of the elastic storage modulus (log E') versus temperature (Celsius) and Tan δ curves, 108, 110, respectively, for PEBAX™ brand 3533 block copolymer material are shown in FIG. 11. Note that, in contrast to the previous two examples, the Tan δ curve 110 does not display a prominent $P_1$ at the lower thermal transition temperature $T_1$. The location of this lower transition temperature is preferably determined numerically by data, although a visual approach could be used. In this instance, the PEBAX™ brand 3533 polymer has a lower thermal transition temperature at −54° C. Using the tangent intersection method, the upper thermal transition temperature $T_2$ marked by point $P_2$ occurs at about 132° C.

In contrast, SANTOPRENE™ brand 111.73 polymeric alloy illustrates a well-defined Tan δ curve 112 (FIG. 12) containing more than one peak. Following the technique outined above, the most prominent peak $P_1$ marks the lower thermal transition temperature $T_1$ at approximately −47° C., the lower extent of the region encompassed by the rubbery plateau on DMA curve 114. The upper extent of the region encompassed by the rubbery plateau and the second thermal transition temperature $T_2$ occurs at 150° C., at the intersection $P_2$ of the tangents from the rubbery plateau and the viscous flow region of the curve 114.

Figure 13:
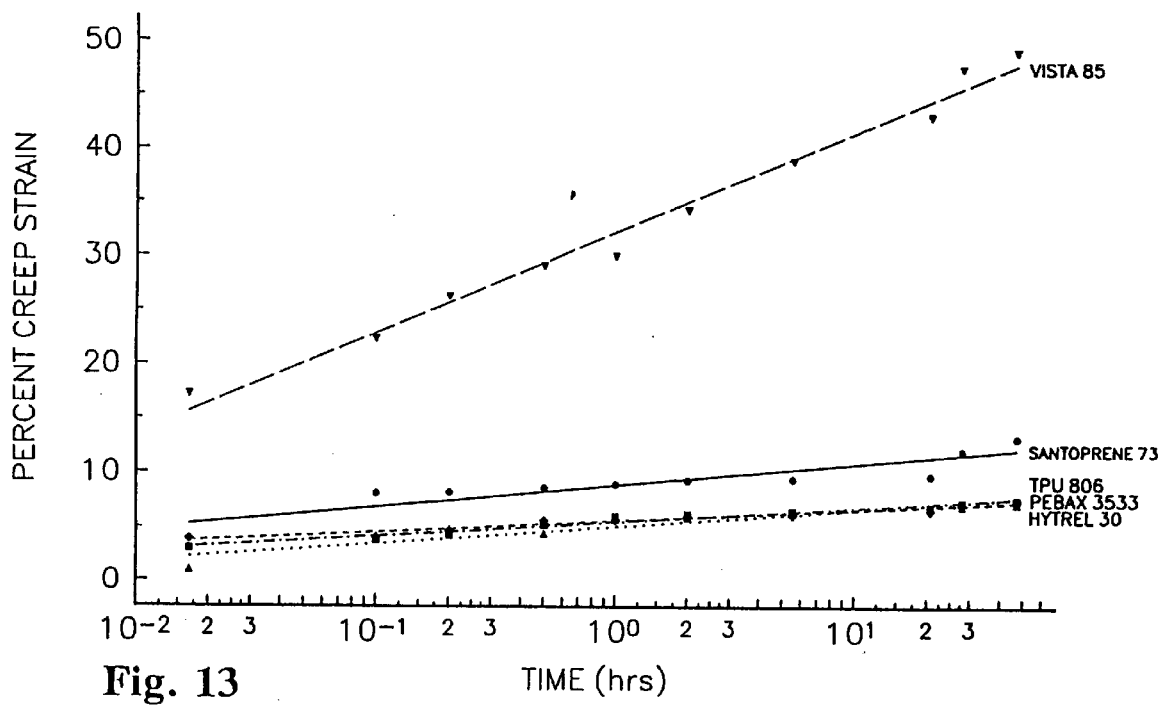
FIGS. 13–16 are graphs illustrating creep strain as a function of temperature for various materials at various temperatures.
Figure 14:
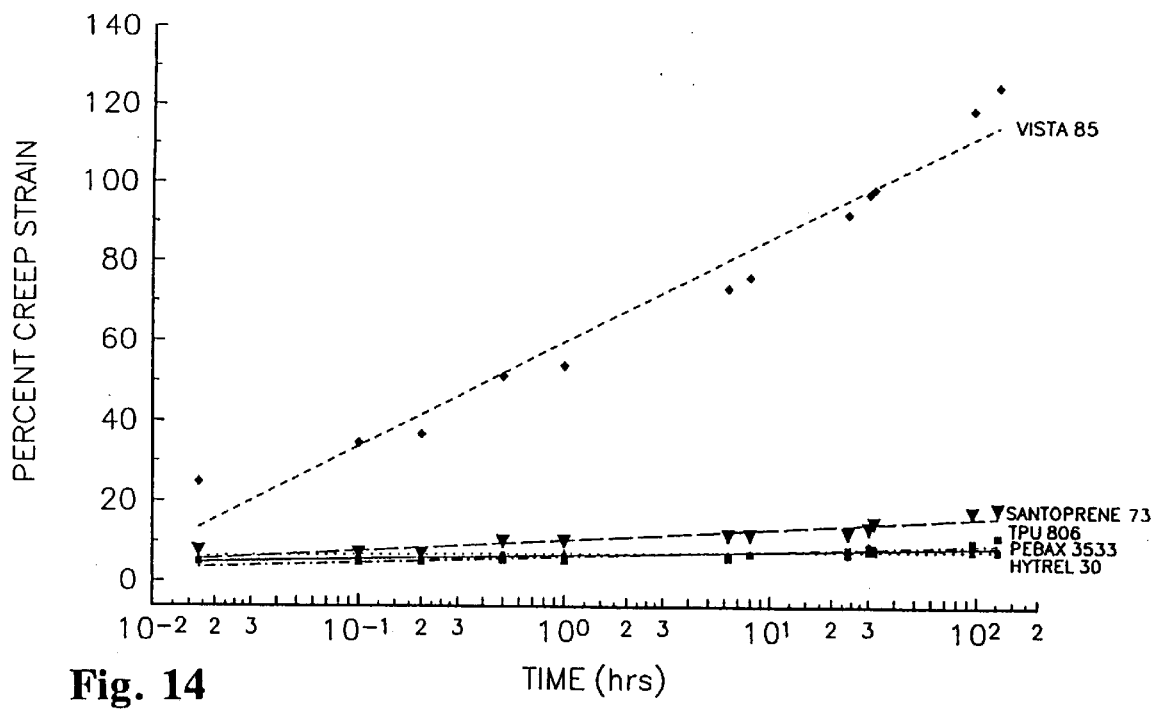
Figure 15:
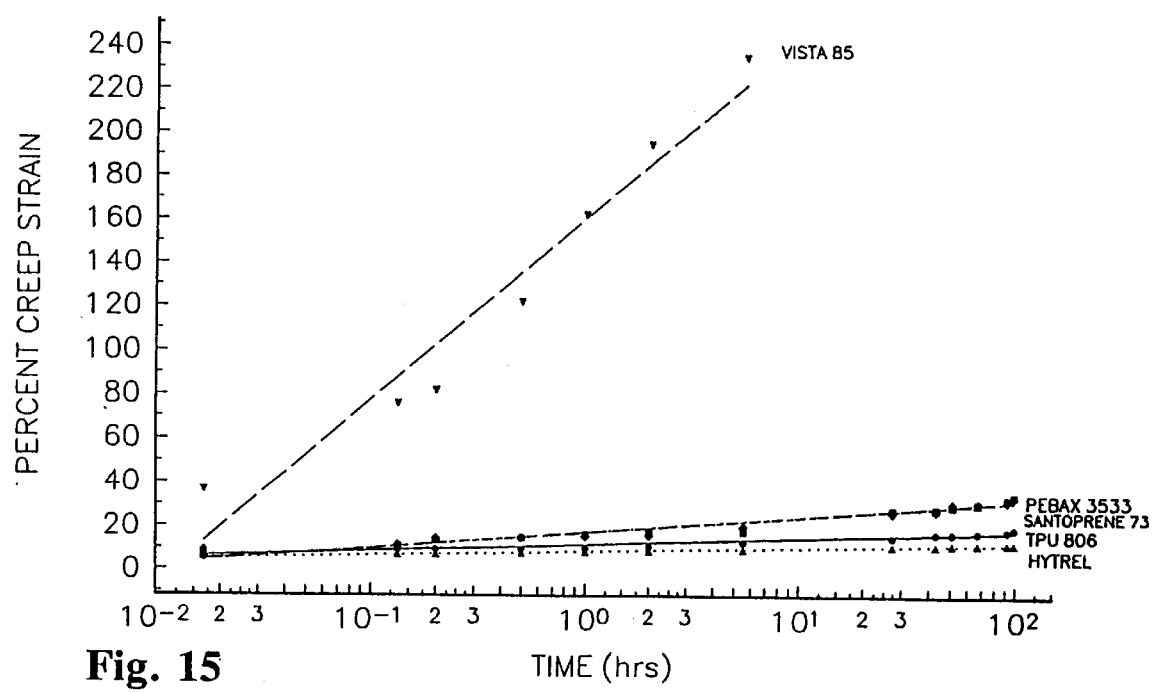

T he result of tests for creep strain are shown in FIGS. 13–15 where percent of creep strain is plotted against time in hours on a logarithmic scale at differing temperatures; namely, 60° C., 80° C., and 100° C. and at a stress of about 85 psi. The curve identified by the de sign ation VISTA™ 85 (VISTA™ brand 484.51) is the curve for a typical single-phase morphology PVC material. The steep slope of the VISTA™ curve indicates that this single-phase melt-processible material is susceptible to excessive creep under load—especially at elevated temperatures. The other curves represent the tensile creep for the SANTOPRENE™, ELASTOLLAN™ (TPU), PEBAX™, and HYTREL™ (HYTREL™ brand HTR 8122) materials identified above. The comparison of the curves clearly shows that single-phase morphology materials are more susceptible to creep strain than multi-phase morphology materials as selected according to this invention, and particularly at elevated temperatures. In general, to achieve the objectives of this present invention, it is desirable that the melt-processible material be selected so that, when tested as described above and at a stress of about 85 psi, the creep of the material at 100° C. is below about 50 percent creep strain.

A plot of the elastic storage modulus versus temperature for five materials, VISTA™ brand 484.51 (curve 201), SANTROPRENE™ brand 117-73 (curve 202), PEBAX™ brand 3533 (curve 203), HYTREL™ brand HTR 8122 (curve 204), and ELASTOLLAN™ brand SP806 (curve 205) used in the examples and creep studies is shown in FIG. 24. The rubbery plateau exhibited by the four multi-phase materials (SANTROPRENE™ brand 111-73, PEBAX™ brand 3533, HYTREL™ brand HTR 8122, and ELASTOLLAN™ brand SP806) is clearly evident and commences roughly between line L1 at about 30° C. and at an elastic storage modulus of about 50 million Pascals, and line L2 at about 120° C. and at an elastic storage modulus of about 10 million Pascals.

By contrast, curve 201 of the single-phase VISTA™ brand 484.51 plasticized PVC material fails to exhibit a rubbery plateau within the temperature range of automotive interest (between about −50° C. to about +150° C.) but, rather, exhibits a steep, steady decline in modulus dropping from about 3 billion Pascals at about −40° C. to below 1 million Pascals at about +140° C. without exhibiting a rubbery plateau within the temperature range of automotive interest.

From the above description, a method is provided for selecting melt-processible materials for use in manufacturing gasketed vehicle window panel assemblies offering long-term bonding of the window panel to the vehicle. This method includes the steps of measuring an elastic storage modulus of the melt-processible material as a function of temperature; plotting the data points gathered from the step of measuring to produce a first curve; and determining whether the first curve produced by the data point displays a glassy region, a rubbery region exhibiting a rubber plateau, and a viscous flow region. From the plot, the method includes selecting a first thermal transition temperature for the gasket material, preferably established by the most prominent peak of a second curve that plots the ratio of the loss modulus of the material to the elastic storage modulus of the material versus temperature. Following the selection of the first thermal transition temperature, a second thermal transition temperature is established by a first line tangential to the rubbery plateau of the first curve, and a second line intersecting with the first line, tangential to the viscous flow region of the second curve. The second thermal transition temperature is identified by the intersection of the first and second lines.

The above description also provides a method for manufacturing a window panel assembly, which comprises the steps of providing a window panel having a peripheral edge, selecting a melt-processible material having a multi-phase morphology, and forming the gasket on at least one surface of the window panel from the melt-processible material selected along or near the peripheral edge. The method further includes the step of locating an attachment member in the gasket and spacing said attachment member from the window panel. In addition to the steps outlined above, the method further contemplates applying an adhesion-promoting compound to at least one surface of the window panel or to a frit layer of the panel. The step of selecting the melt-processible material includes selecting from the group of polymers consisting essentially of block copolymers, physical blends and alloys, two-phase graft copolymers, and blends thereof with each other. The step of selecting the melt-processible material further includes the step of selecting the material from a group of polymers having a glassy phase, a rubbery plateau, and a viscous flow phase.

The invention results in a vehicle window panel assembly including a window panel having a gasket attached to at least one surface of the window panel with the gasket formed from a melt-processible material having a multi-phase morphology. The melt-processible material used to form the gasket further exhibits characteristics displaying a rubbery plateau bounded by a glassy region and a viscous flow region, and disposed between thermal transition temperature points. In a preferred embodiment of the vehicle panel assembly, the gasket material has a first thermal transition temperature less than 24° C., preferably less than 0° C., and most preferably less than −20° C. The second thermal transition temperature is greater than 60° C., preferably greater than 80° C., and most preferably greater than 100° C. The melt-processible materials having these thermal transition temperatures are preferably selected from a group of polymers consisting essentially of block copolymers, physical blends and alloys, multi-phase graft copolymers, and blends of the above with each other or with other polymers where the resultant blend achieves the objectives of the present invention. The vehicle window panel assembly further preferably includes a frit layer bonded to at least one surface of the window panel between the window panel and the gasket. Furthermore, an adhesion-promoting compound may be deposited between the gasket and the frit layer or between the gasket and the one surface of the window panel receiving the gasket. Mounted within the gasket member and extending therefrom are one or more attachment members for mounting the window panel assembly in the vehicle. Such attachment members include a fastener having a base portion encapsulated in a gasket and a shaft portion extending from the gasket for engaging the vehicle. Such attachment members include a stud having a head portion at least partially surrounded by the gasket material and a shaft extending from the head and out the gasket to engage the vehicle. The head of the stud is preferably spaced from the window panel by the gasket material. As an alternate to at least partially encapsulating the head portion of the stud, this head portion can be directly adhered to the gasket material using a suitable adhesive such as a urethane, acrylic, silicone, or epoxy adhesive.

Using the method of selecting the gasket materials according to this invention, and manufacturing single-, two-, or three-sided encapsulations on the window using such selected materials, a modular window assembly is produced which is better suited for the wide-range of environments that the vehicle encounters over its useful life with a significantly reduced risk of a failure in the gasket assembly bonding the window panel to the vehicle. By selecting gasket materials according to the method and teachings described herein, single-, two-, or three-sided gasketed window panels can be secured in the window opening using attachment members without deteriorating the bond between the Gasket member and the window panel assembly. Such seletion results in an improved window panel assembly capable of withstanding prolonged dynamic and static loads without a failure of the bond, and with secure retention of any attachment member, such as a stud, partially encapsulated by and floating in the gasket. The prolonged life of the window panel assembly results in a substantial saving to the vehicle owner as well as reduced repair costs to the manufacturer resulting from warranty work. Such improved modular window panel assemblies are useful in a variety of vehicles and especially for large area windows, and particularly for large area flush-mounted glazings, such as are used as front, rear, and side windows, and as sunroofs, in automobiles, minivans, vans, trucks, and busses and which utilize a window panel that weighs at least about 3 kilograms (with a window panel weight of at least 5 kilograms common for front and rear windows, and for side windows on minivans and larger vehicles) and with a window panel area of at least about 350 square inches.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A method for manufacturing a vehicle window panel assembly, comprising the steps of:

providing a window panel having a peripheral edge;

selecting a melt-processible, polymeric material which has a multi-phase morphology, is resistant to tensile creep, and has a glassy phase, a rubbery plateau, a viscous flow phase, a first transition temperature between said glassy phase and said rubbery plateau, and a second transition temperature between said rubbery plateau and said viscous flow phase; and forming and adhering a gasket on at least one surface of said window panel from said melt-processible material;

providing an attachment member for securing said vehicle window panel assembly to a vehicle body;

embedding a first portion of said attachment member in said gasket during formation of said gasket such that a second portion of said attachment member extends from said gasket for securement to the vehicle body, whereby said gasket is securely bonded to said one surface of said window panel and said melt-processible polymeric material resists creep when said window panel is attached to a vehicle with said attachment member.

2. The method as defined in claim 1, further including the step of locating said attachment member in a gasket forming cavity of a mold apparatus such that said first portion of said attachment member is spaced from said window panel while said second portion of said attachment member extends out of said cavity.

3. The method defined in claim 2, wherein the step of selecting said melt-processible material includes the step of selecting a polymer from the group consisting essentially of a styrene/butadiene/styrene elastomer, a styrene/ethylene/butadiene/styrene elastomer, a copolyester elastomer, a polyether block amide, a thermoplastic urethane, a methacrylate/butadiene/styrene elastomer, a polypropylene/EPDM blend, a polyvinyledene chloride/ethylene vinyl acetate blend, a PVC/ethylene terpolymer blend, and a PVC/nitrile rubber blend.

4. The method as defined in claim 3, wherein the step of selecting said polymer material includes selecting one of said thermoplastic urethane, said polyether block amide, said polypropylene/EPDM blend, and said copolyester elastomer.

5. The method as defined in claim 4, wherein the step of selecting said polymer material includes selecting said thermoplastic urethane.

6. The method as defined in claim 4, wherein the step of selecting said polymer material includes selecting said polyether block amide.

7. The method as defined in claim 4, wherein the step of selecting said polymer material includes selecting said polypropylene/EPDM blend.

8. The method as defined in claim 2, wherein the vehicle includes one of an automobile, a minivan, a van, a truck, and a bus.

9. The method as defined in claim 8, wherein the step of providing said window panel includes providing at least one of a side window, a front window, a sunroof, and a rear window of the vehicle.

10. The method as defined in claim 9, wherein the step of providing said window panel includes providing said window panel with a weight of at least about 3 kilograms and an area of at least about 350 square inches.

11. The method as defined in claim 2, further including the step of applying an adhesion-promoting compound to said at least one surface of said window panel and forming said gasket on said adhesion promoting compound.

12. The method as defined in claim 2 including providing said window panel with a frit layer on said at least one surface of said window panel and forming said gasket on said frit layer.

13. The method as defined in claim 2, wherein said window panel is one of a side window, a front window, a rear window, and a sunroof of one of an automobile, a minivan, a van, a truck, and a bus.

14. The method as defined in claim 13, wherein said window panel has a weight of at least 3 kilograms and an area of at least about 350 square inches.

15. A product made according to the method as defined in claim 1.

16. The method as defined in claim 1, wherein the step of selecting said melt-processible material includes selecting from a group of polymers consisting essentially of: block copolymers, physical blends and alloys, two-phase graft copolymers, and blends thereof with each other.

17. The method as defined in claim 16, wherein the step of selecting said melt-processible material includes selecting from the group consisting essentially of one of a styrene/butadiene/styrene elastomer, a styrene/ethylene/butadiene/styrene elastomer, a copolyester elastomer, a polyether block amide, a thermoplastic urethane, a methacrylate/butadiene/styrene elastomer, a polypropylene/EPDM blend, a polyvinyledene chloride/ethylene vinyl acetate blend, a PVC/ethylene terpolymer blend, and a PVC/nitrile rubber blend.

18. The method as defined in claim 16, wherein the step of selecting said melt-processible material includes selecting one of a thermoplastic urethane, a polyether block amide, a polypropylene/EPDM blend, and a copolyester.

19. The method as defined in claim 16, wherein the step of selecting said melt-processible material includes selecting a thermoplastic urethane.

20. The method as defined in claim 16, wherein the step of selecting said melt-processible material includes selecting a polyether block amide.

21. The method as defined in claim 16, wherein the step of selecting said melt-processible material includes selecting a polypropylene/EPDM blend.

22. The method as defined in claim 1, wherein said first thermal transition temperature is less than 24° C.

23. The method as defined in claim 22, wherein said second thermal transition temperature is greater than 60° C.

24. A method for manufacturing a vehicle window panel assembly, comprising the steps of:

provided a window panel;

selecting a melt-processible, polymeric material which has a multi-phase morphology, is resistant to tensile creep, and has a glassy phase, a rubbery plateau, a viscous flow phase, a first transition temperature between said glassy phase and said rubbery plateau, and a second transition temperature between said rubbery plateau and said viscous flow phase;

forming and adhering a gasket on at least one surface of said window panel from said melt-processible material;

providing an attachment member for securing said vehicle window panel assembly to a vehicle body;

embedding a portion of said attachment member in said gasket during formation of said gasket such that said attachment member portion is spaced from said surface of said window panel while another portion of said attachment member extends from said gasket for securement to the vehicle body, whereby said gasket is securely bonded to said one surface of said window panel and said melt-processible polymeric material resists creep when said window panel is attached to a vehicle with said attachment member.

25. A product made according to the method as defined in claim 24.

26. A method for manufacturing a vehicle window panel assembly, comprising the steps of:

providing a window panel;

selecting a melt-processible, polymeric material which has a multi-phase morphology, is resistant to tensile creep, and has a glassy phase, a rubbery plateau, a viscous flow phase, a first transition temperature between said glassy phase and said rubbery plateau, and a second transition temperature between said rubbery plateau and said viscous flow phase;

said step of selecting said melt-processible polymeric material including selecting said material from a group of polymers consisting of block copolymers, physical blends and alloys, two-phase graft copolymers, and blends thereof with each other;

applying an adhesion promoting compound to at least one surface of said window panel;

forming and bonding a gasket from said selected material on said adhesion promoting compound on said at least one surface of said window panel;

providing an attachment member for securing said vehicle window panel assembly to a vehicle body;

embedding a first portion of said attachment member in said gasket during formation of said gasket such that a second portion of said attachment member extends from said gasket for securement to the vehicle body, whereby said gasket is securely bonded to said one surface of said window panel and said melt-processible polymeric material resists creep when said window panel is attached to a vehicle with said attachment member.

27. A product made according to the method as defined in claim 26.

28. A method for manufacturing a vehicle window panel assembly comprising the steps of:

providing a window panel;

selecting a melt-processible, polymeric material capable of forming cross-links;

forming and adhering a gasket on at least one surface of said window panel from said melt-processible polymeric material;

providing an attachment member adapted to secure said vehicle window panel assembly to a vehicle body; and embedding a first portion of said attachment member in said gasket and cross-linking said melt-processible material during formation of said gasket such that a second portion of said attachment member extends from said gasket for securement to the vehicle body, whereby said gasket is securely bonded to said one surface of said window panel and said cross-linked polymeric material of said gasket resists creep when said window panel is attached to the vehicle with said attachment member.

\* \* \* \* \*

UNITED STATES PATENT AND TRADEMARK OFFICE
CERTIFICATE OF CORRECTION

PATENT NO.    : 5,822,932
DATED         : October 20, 1998
INVENTOR(S)   : Agrawal It is certified that error appears in the above-identified patent and that said Letters Patent is hereby corrected as shown below:

Column 11,
Line 7, "Twithin" should be -- T within --.

Column 15,
Line 12, "stackedcavity" should be -- stacked-cavity --.

Column 17,
Line 67, "single-phas e" should be -- single-phase --.

Column 18,
Line 31, "reaion" should be -- region --.
Line 31, "o n" should be -- on --.
Line 59, "T he" should be -- The --.
Line 63, "de sign ation" should be -- designation --.

Column 20,
Line 66, "Gasket" should be -- gasket --.
Line 67, "seletion" should be -- selection --.

Signed and Sealed this

Eighteenth Day of February, 2003

JAMES E. ROGAN
*Director of the United States Patent and Trademark Office*